United States Patent
Truckenbrod et al.

(10) Patent No.: US 9,689,598 B2
(45) Date of Patent: Jun. 27, 2017

(54) SYSTEMS AND METHODS OF POWERING A REFRIGERATION UNIT OF A HYBRID VEHICLE

(75) Inventors: Gregory Robert Truckenbrod, Fridley, MN (US); Arnost Hurych, Prague (CZ); Bruce Kranz, Farmington, MN (US); Eric Kirby, Bloomington, MN (US); Michael D. Gilman, Rogers, MN (US); Richard W. Schmidt, Plymouth, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 1359 days.

(21) Appl. No.: 12/721,325

(22) Filed: Mar. 10, 2010

(65) Prior Publication Data

US 2010/0229581 A1 Sep. 16, 2010

Related U.S. Application Data

(60) Provisional application No. 61/158,964, filed on Mar. 10, 2009.

(51) Int. Cl.
*H02J 1/00* (2006.01)
*H02J 3/00* (2006.01)
(Continued)

(52) U.S. Cl.
CPC ........... *F25B 49/025* (2013.01); *B60H 1/004* (2013.01); *B60H 1/00428* (2013.01); *F25B 2600/021* (2013.01)

(58) Field of Classification Search
USPC .......................................... 307/85–87, 72–76
See application file for complete search history.

(56) References Cited

U.S. PATENT DOCUMENTS

| 4,152,661 A | 5/1979 | Zeis |
| 4,853,553 A | 8/1989 | Hosie |

(Continued)

FOREIGN PATENT DOCUMENTS

| EP | 1504227 | 2/2005 |
| WO | 03093737 | 11/2003 |
| WO | 2008094148 | 8/2008 |

OTHER PUBLICATIONS

PCT/US2010/026840 International Search Report and Written Opinion of the International Searching Authority mailed May 12, 2010, 11 pages.

(Continued)

*Primary Examiner* — Rexford Barnie
*Assistant Examiner* — Dru Parries
(74) *Attorney, Agent, or Firm* — Hamre, Schumann, Mueller & Larson, P.C.

(57) ABSTRACT

Systems and methods for providing power to a refrigeration unit or an air conditioner used on a hybrid vehicle. The system includes an accumulation choke, a PWM rectifier, and a frequency inverter. The accumulation choke is configured to receive a first AC power, a second AC power, and a DC power. The accumulation choke and PWM rectifier convert the received power into an intermediate DC power having a peak voltage. The PWM rectifier provides the intermediate DC power to the frequency inverter. The frequency inverter converts the intermediate DC power to an output AC power. The frequency inverter provides the output AC power to the refrigeration unit.

20 Claims, 19 Drawing Sheets

(51) Int. Cl.
*F25B 49/02* (2006.01)
*B60H 1/00* (2006.01)

(56) References Cited

U.S. PATENT DOCUMENTS

| | | | |
|---|---|---|---|
| 5,056,330 A | 10/1991 | Isobe et al. | |
| 5,432,695 A | 7/1995 | Vlatkovic et al. | |
| 5,595,064 A | 1/1997 | Ikeda et al. | |
| 6,013,904 A | 1/2000 | Storm et al. | |
| 6,123,000 A | 9/2000 | Stewart et al. | |
| 6,186,254 B1 | 2/2001 | Mufford et al. | |
| 6,196,009 B1 | 3/2001 | Nishi et al. | |
| 6,543,240 B2 | 4/2003 | Grafton | |
| 6,622,505 B2 | 9/2003 | Anderson et al. | |
| 6,624,533 B1 | 9/2003 | Swanson et al. | |
| 6,889,762 B2 | 5/2005 | Zeigler et al. | |
| 6,979,913 B2 | 12/2005 | Storm et al. | |
| 6,979,973 B2 | 12/2005 | Yoo | |
| 7,005,829 B2 | 2/2006 | Schnetzka | |
| 7,057,303 B2 | 6/2006 | Storm et al. | |
| 7,057,376 B2 | 6/2006 | Cook et al. | |
| 7,145,788 B2 | 12/2006 | Plummer | |
| 7,151,326 B2 | 12/2006 | Jordan | |
| 7,241,146 B1 | 7/2007 | Kim et al. | |
| 7,253,584 B2 | 8/2007 | Souther et al. | |
| 7,266,962 B2 * | 9/2007 | Montuoro et al. | 62/236 |
| 7,276,815 B2 | 10/2007 | Algrain et al. | |
| 7,331,383 B2 | 2/2008 | Turner et al. | |
| 7,377,237 B2 | 5/2008 | Carney et al. | |
| 7,398,849 B2 | 7/2008 | Yoshida | |
| 7,400,059 B2 | 7/2008 | Algrain et al. | |
| 7,408,273 B2 | 8/2008 | Slocum | |
| 7,531,977 B2 | 5/2009 | Mazaika | |
| 2004/0189099 A1 | 9/2004 | Wild | |
| 2005/0016713 A1 | 1/2005 | Houck et al. | |
| 2005/0063121 A1 | 3/2005 | Jordan | |
| 2006/0076835 A1 | 4/2006 | Slocum | |
| 2006/0214637 A1 | 9/2006 | Gonzales et al. | |
| 2007/0023210 A1 | 2/2007 | Bernardi et al. | |
| 2007/0062684 A1 | 3/2007 | Turner et al. | |
| 2007/0131408 A1 | 6/2007 | Zeigler et al. | |
| 2007/0175230 A1 | 8/2007 | Plummer et al. | |
| 2007/0209378 A1 | 9/2007 | Larson | |
| 2007/0221370 A1 | 9/2007 | Allen et al. | |
| 2008/0011007 A1 | 1/2008 | Larson et al. | |
| 2008/0157593 A1 | 7/2008 | Bax et al. | |
| 2008/0164850 A1 | 7/2008 | Ayana et al. | |
| 2008/0271937 A1 * | 11/2008 | King et al. | 180/165 |
| 2008/0275600 A1 | 11/2008 | Rask et al. | |
| 2009/0056354 A1 * | 3/2009 | Davis et al. | 62/236 |
| 2009/0103341 A1 | 4/2009 | Lee et al. | |
| 2011/0162395 A1 * | 7/2011 | Chakiachvili et al. | 62/115 |

OTHER PUBLICATIONS

Chinese Office Action for Application No. 201080020381.X dated May 23, 2013 (Translation and Original, 19 pages).
European Office Action issued in corresponding European Application No. 10751362.4 dated Apr. 25, 2016 (7 pages).

* cited by examiner

US 9,689,598 B2

SYSTEMS AND METHODS OF POWERING A REFRIGERATION UNIT OF A HYBRID VEHICLE

RELATED APPLICATION

The present application claims the benefit of prior filed U.S. Provisional Patent Application No. 61/158,964 filed on Mar. 10, 2009, the entire content of which is hereby incorporated by reference.

BACKGROUND

Refrigeration units, e.g., for refrigerated trucks or rail cars, typically include an internal combustion engine which drives a compressor of the refrigeration unit via a belt. Some refrigeration units also include means for plugging the unit into electrical mains (shore power) for powering the unit when the unit is not in transit. The shore power powers an electric motor which drives the compressor via a belt.

SUMMARY

In one embodiment, the invention provides a power system for powering a refrigeration unit. The power system includes a first set of connections, a second set of connections, and a third set of connections. The first set of connections are configured to receive power from a first power source, the first power source being a first high-voltage AC power source. The second set of connections are configured to receive power from a second power source, the second power source being a high-voltage DC power source. The third set of connections are configured to receive power from a third power source, the third power source being a second high-voltage AC power source. The power system couples the first power source to the refrigeration unit when power is received at the first set of connections, couples the second power source to the refrigeration unit when power is received at the second set of connections but not the first set of connections, and couples the third power source to the refrigeration unit when power is not available from both the first and second set of connections.

In another embodiment, the invention provides a power system for powering a refrigeration unit. The power system includes a first connection, a second connection, a third connection, and a power converter. The first connection is configured to receive power from a first power source. Where the first power source is a first high-voltage alternating current (AC) power source. The second connection is configured to receive power from a second power source. Where the second power source is a high-voltage direct current (DC) power source. The third connection is configured to receive power from a third power source. Where the third power source is a second high-voltage AC power source. The power converter is configured to supply power to the refrigeration unit. The power system couples the first power source to the power converter when power is received at the first connection, couples the second power source to the power converter when power is received at the second connection but not the first connection, and couples the third power source to the power converter when power is not available from both the first and second connections.

In another embodiment, the invention provides a system for powering a refrigeration unit coupled with a hybrid vehicle having a plurality of high-voltage batteries. The system includes a power system, a refrigeration control unit, and an engine. The power system is coupled to the plurality of high-voltage batteries and is configured to receive power from a shore power source. The refrigeration control unit is coupled to the power system, and receives an indication from the power system of the availability of power from the high-voltage batteries and the shore power source. The engine is also coupled to the refrigeration control unit. The refrigeration control unit links power from the power system to the refrigeration unit when power is available from the power system, and links the engine to the refrigeration unit when power is not available from the power system.

In another embodiment, the invention provides a method of powering a refrigeration unit. The method includes the acts of receiving at a first input a high-voltage DC power from a plurality of batteries of a hybrid vehicle, receiving at a second input a high-voltage AC power from an electric mains, connecting one of the first input and the second input to a power converter based on a position of a switch, the connecting act coupling one of the high-voltage DC power and the high-voltage AC power to the power converter thereby resulting in a coupled power, disconnecting the coupled power from the power converter when the position of the switch has changed, converting the coupled power into a second high-voltage AC power, and providing the second high-voltage AC power to the refrigeration unit.

The invention relates to systems and methods for powering a refrigeration or air conditioning unit used with a hybrid vehicle, such as a truck or bus. In one embodiment, the invention uses high-voltage power from the batteries of the hybrid vehicle to power the refrigeration unit, while maintaining the capability of using shore power or operating the compressor using an internal combustion engine when the power available from the batteries is not available.

In another embodiment, the invention provides a system for providing power to a refrigeration unit used on a hybrid vehicle. The system includes an accumulation choke, a PWM rectifier, and a frequency inverter. The accumulation choke is configured to receive a first AC power having a voltage range of about 150 to 600 VAC, a second AC power of about 150 to 600 VAC, and a DC power having a voltage range of about 263 to 408 VDC. The accumulation choke and PWM rectifier convert the received power into an intermediate DC power having a peak voltage of about 750 VDC. The PWM rectifier provides the intermediate DC power to the frequency inverter. The frequency inverter converts the intermediate DC power to a variable output AC power having a voltage of about 0 to 525 VAC and a frequency of about 0 to 100 Hertz (Hz). The frequency inverter provides the output AC power to the refrigeration unit.

In another embodiment, the invention provides a system for providing power to a refrigeration unit used on a hybrid vehicle. The system includes an accumulation choke, a PWM rectifier, and a frequency inverter. The accumulation choke is configured to receive an AC power having a voltage range of about 150 to 600 VAC and a DC power having a voltage range of about 263 to 408 VDC. The accumulation choke and PWM rectifier convert the received power into an intermediate DC power having a peak voltage of about 750 VDC. The PWM rectifier provides the intermediate DC power to the frequency inverter. The frequency inverter converts the intermediate DC power to an output AC power having a voltage of about 0 to 525 VAC. The frequency inverter provides the output AC power to the refrigeration unit. If the AC power and the DC power are not available, the refrigeration unit is driven by an internal combustion engine.

In yet another embodiment, the invention provides a method of providing power to a refrigeration unit used on a hybrid vehicle. The method includes providing to a power unit a first AC power from an external source, providing to the power unit a DC power from high-voltage batteries of the hybrid vehicle, determining if the first AC power is sufficient to power the refrigeration unit, using the first AC power to generate an output AC power if the first AC power is determined to be sufficient to power the refrigeration unit, determining if the DC power is sufficient to power the refrigeration unit, using the DC power to generate the output AC power if the first AC power is not sufficient to power the refrigeration unit and the DC power is sufficient to power the refrigeration unit, generating the output AC power from a belt driven alternator if the first AC power and the DC power are not sufficient to power the refrigeration unit, and providing the output AC power to the refrigeration unit.

In another embodiment, the invention provides a system for powering a refrigeration unit of a hybrid vehicle. The system includes an external source of power, a power unit for receiving AC power from the external source of power, a battery charger receiving AC power from the external source of power, and a plurality of batteries forming a high-voltage battery for powering the hybrid vehicle. The power unit modifies the AC power into an output AC power suitable to operate the refrigeration unit. The charger recharges the plurality of batteries.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof encompass direct and indirect mountings, connections, supports, and couplings. Further, "connected" and "coupled" are not restricted to physical or mechanical connections or couplings.

Figure 1A:
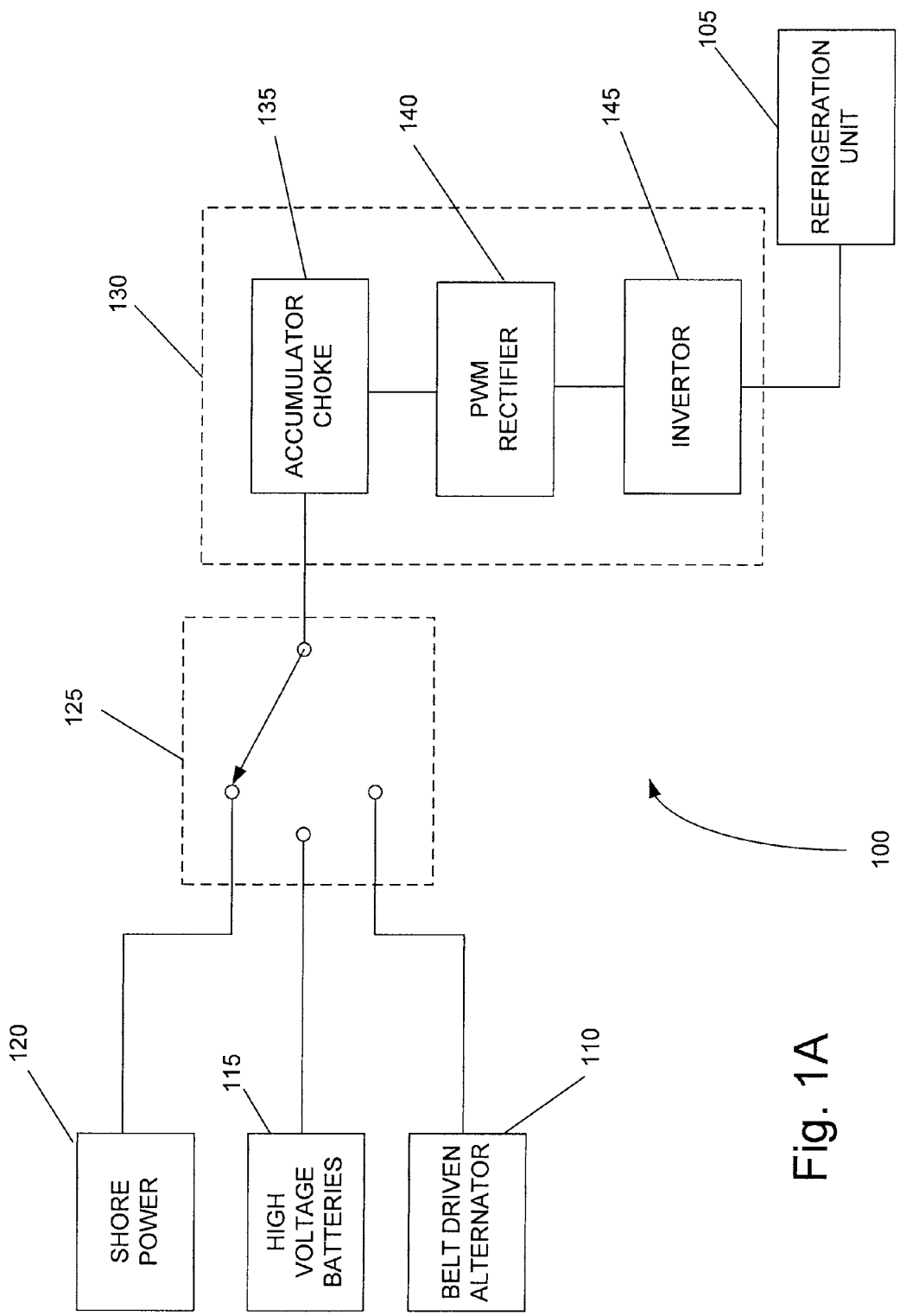
FIG. 1A is a block diagram of a construction of a power system for a hybrid vehicle with a refrigeration unit.

FIG. 1A shows a block diagram of a construction of a system 100 for powering a refrigeration unit 105 using power from a belt driven alternator 110, from high-voltage batteries 115 of a hybrid vehicle, and from shore power 120. A switch 125 selects which of the three power sources 110, 115, and 120 is used. In some constructions, the switch 125 is a manual switch, where a user selects which power source 110, 115, and 120 to use. In other constructions, the switch 125 is automatic, where a controller senses which power source(s) are providing sufficient power to operate the refrigeration unit 105 and selects the most appropriate power source to use. For example, in some embodiments, shore power 120 is used whenever it is available, followed by power from the high-voltage batteries 115, and finally by power from the belt driven alternator 110. In addition, the controller may control operation of an internal combustion engine used to drive the alternator, turning on the engine when there is insufficient power available from the shore power 120 or the high-voltage batteries 115, and turning off the engine when there is sufficient power available from either the shore power 120 or the high-voltage batteries 115, thus saving energy (i.e., fuel).

In some constructions, the power available from the belt driven alternator 110 is about 150 to 600 volts AC (VAC), the power available from the high-voltage batteries 115 is about 263 to 408 volts DC (VDC), and the power available from shore power 120 is about 150 to 600 VAC. In the construction shown, AC power is assumed to be three-phase, however the invention contemplates the use of single-phase AC power as well.

Depending on the position of the switch 125, set either manually or automatically, the power from one of the power sources 110, 115, and 120 is applied a power converter 130 including an accumulation choke 135, a pulse-width-modulated (PWM) rectifier 140, and a frequency inverter 145. The accumulation choke 135 is coupled to the PWM rectifier 140. The accumulation choke 135 operates with the PWM rectifier 140 to convert/modify the power received from the belt driven alternator 110, the high-voltage batteries 115, or the share power 120 to a DC voltage having a maximum amplitude of about 750 VDC. The DC voltage is provided to the frequency inverter 145 which converts the DC voltage to a variable voltage of 0 to 525 VAC having a frequency of about 0 to 100 Hz, which is provided to the refrigeration unit 105. In some constructions, the DC power from the PWM rectifier 140 is also used to supply a DC chopper for an electric heater. The DC chopper provides DC power having a variable voltage of about 0 to 750 V DC.

Figure 1B:
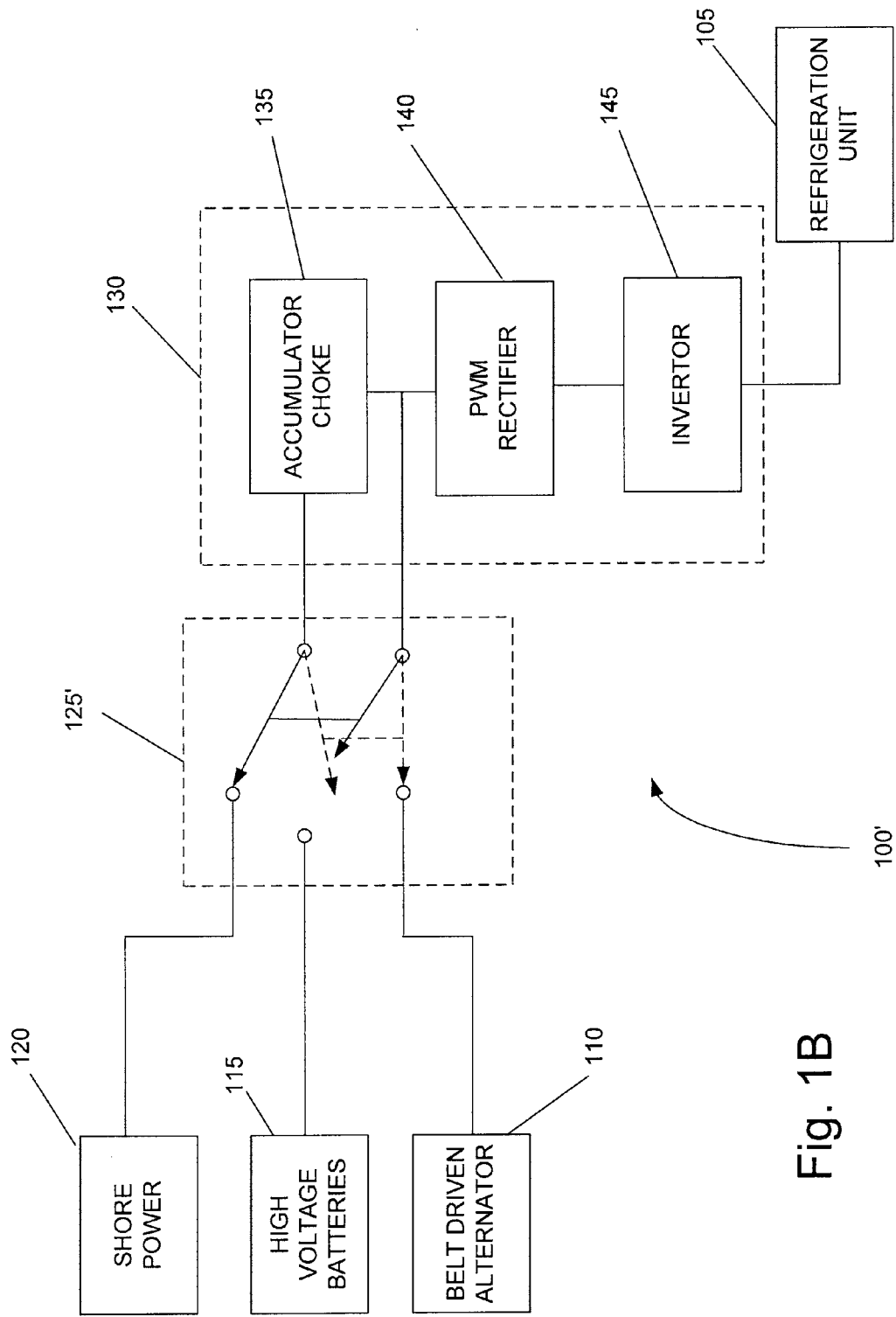
FIG. 1B is a block diagram of an alternative construction of a power system for a hybrid vehicle with a refrigeration unit.

FIG. 1B shows a block diagram of an alternate construction of a system 100' for powering a refrigeration unit 105 using power from a belt driven alternator 110, from high-voltage batteries 115 of a hybrid vehicle, and from shore power 120. Again a switch 125' selects which of the three power sources 110, 115, and 120 is used. However, in the construction shown, the switch 125' has multiple throws such that when power from the belt driven alternator 110 is selected, the alternator 110 is connected directly to the PWM rectifier 140, bypassing the accumulation choke 135. Except for the alternator 110 being connected directly to the PWM rectifier 140, the operation of the system 100' is the same as the operation of system 100 described above. The construction shown in FIG. 1B can be used when the inductance of the belt driven alternator 110 is great enough that the accumulation choke 135 is not necessary.

Figure 2A:
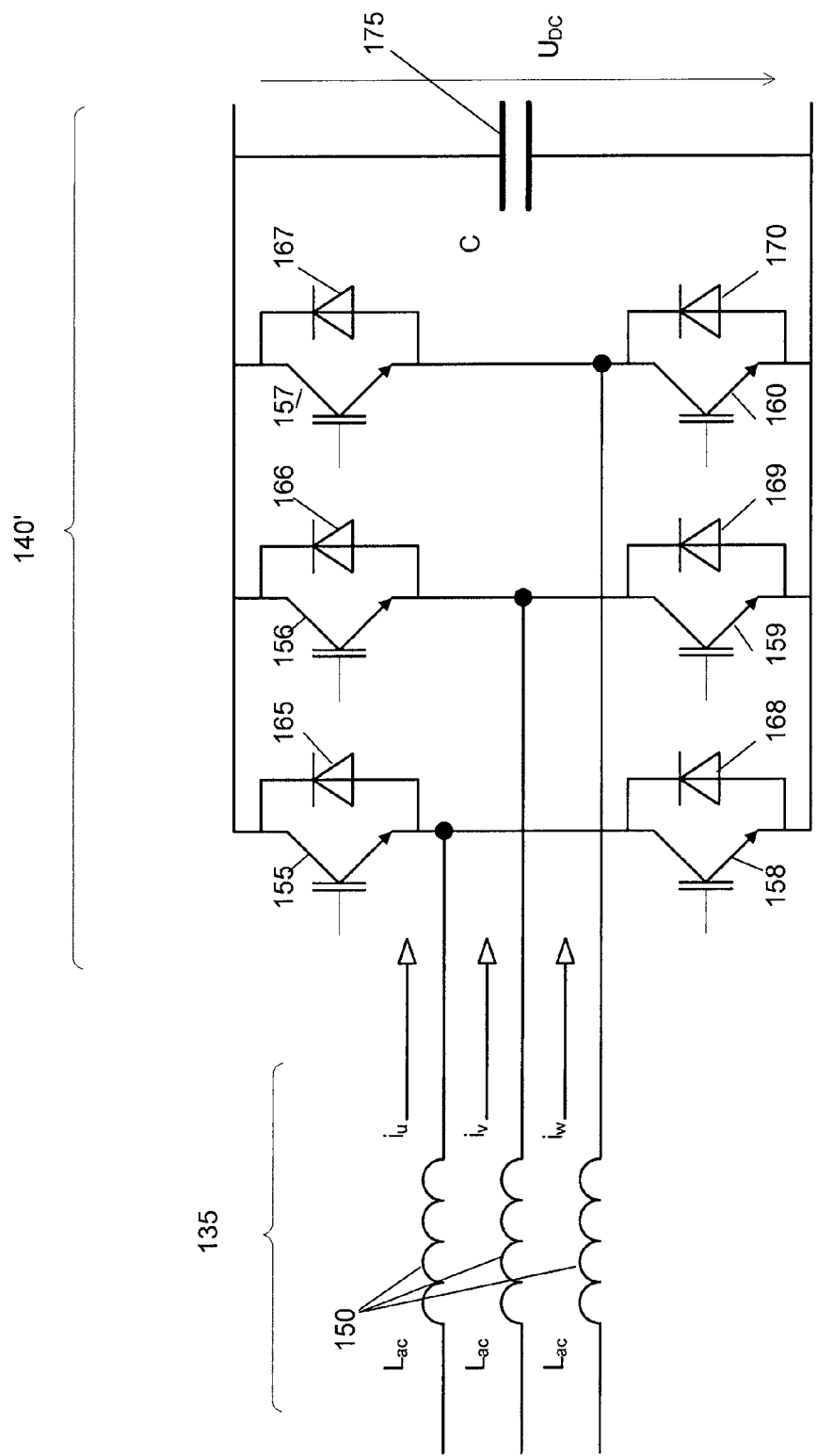
FIG. 2A is a schematic diagram of a construction of an accumulation choke and a full-control PWM rectifier for use with three-phase AC power.

FIG. 2A shows a schematic diagram of a construction of the accumulation choke 135 and a full-controlled PWM rectifier 140'. The accumulation choke 135 includes a plurality of inductors 150. The full-controlled PWM rectifier 140' includes six insulated gate bipolar transistors (IGBT) 155-160, each IGBT 155-160 having a diode 165-170 connected across its collector and emitter, and a capacitor 175.

Figure 2B:
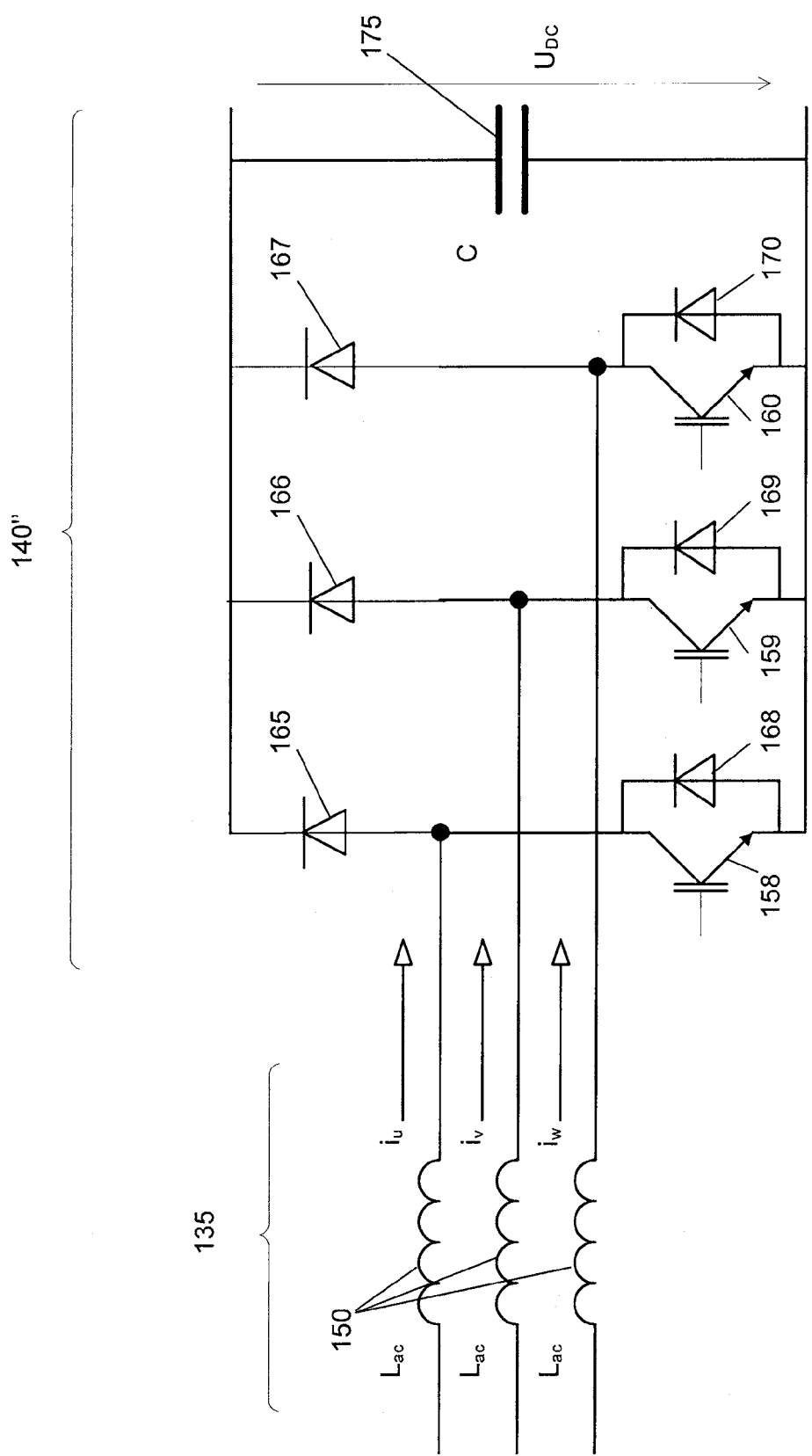
FIG. 2B is a schematic diagram of a construction of an accumulation choke and a half-control PWM rectifier for use with three-phase AC power.

FIG. 2B shows a schematic diagram of a construction of the accumulation choke 135 and a half-controlled PWM rectifier 140". The accumulation choke 135 includes a plurality of inductors 150. The half-controlled PWM rectifier 140" includes three insulated gate bipolar transistors (IGBT) 158-160, each IGBT 158-160 having a diode 168-170 connected across its collector and emitter, three diodes 155-157 connected in an upper branch of the half-controller PWM rectifier 140", and a capacitor 175.

Figure 3A:
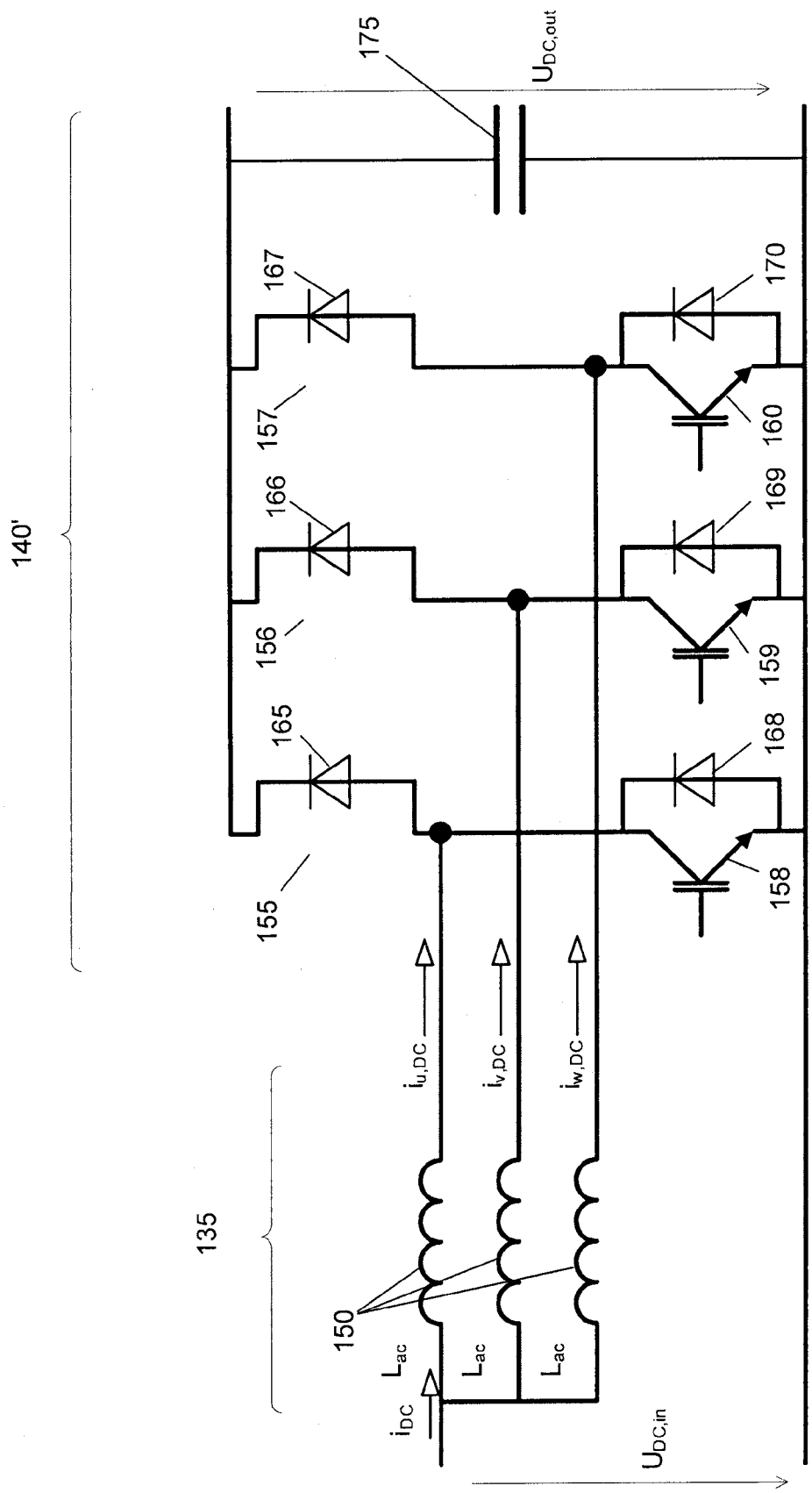
FIG. 3A is a schematic diagram of a construction of an accumulation choke and a full-control PWM rectifier for use with DC power.

FIG. 3A shows a schematic representation of the accumulation choke 135 and a full-controlled PWM rectifier 140' for use with DC input power from the high-voltage batteries 115. The accumulation choke 135 and the full-controlled PWM rectifier 140' include all the same components as described above with respect to FIG. 2A; however, the DC input voltage is applied to each inductor 150 and the upper IGBTs 155-157 are not used (i.e., they remain open).

Figure 3B:
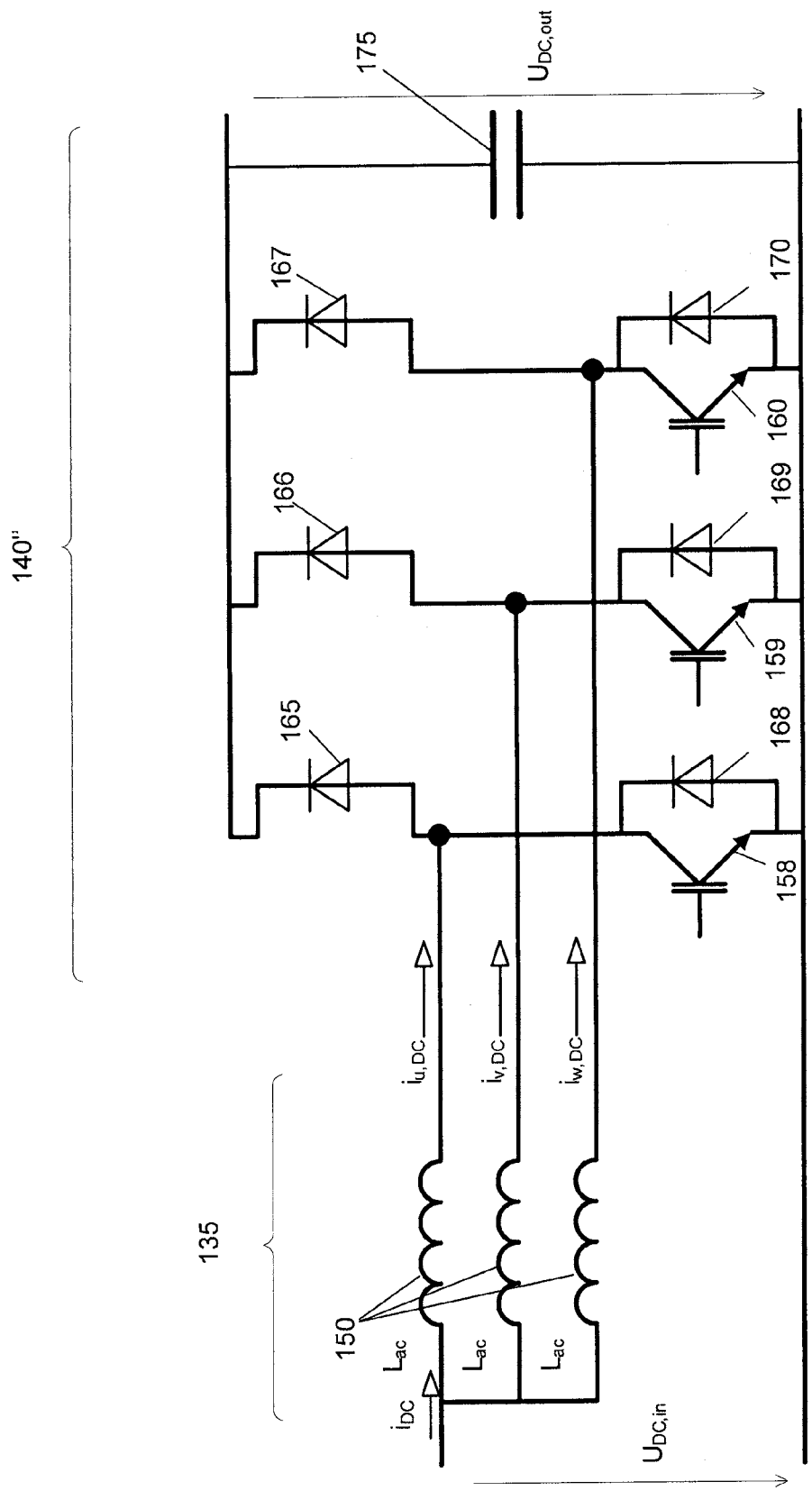
FIG. 3B is a schematic diagram of a construction of an accumulation choke and a half-control PWM rectifier for use with DC power.

FIG. 3B shows a schematic diagram of a construction of the accumulation choke 135 and a half-controlled PWM rectifier 140" for use with DC input power from the high-voltage batteries 115. The accumulation choke 135 includes a plurality of inductors 150. The half-controlled PWM rectifier 140" includes three insulated gate bipolar transistors (IGBT) 158-160, each IGBT 158-160 having a diode 168-170 connected across its collector and emitter, three diodes 155-157 connected in an upper branch of the half-controller PWM rectifier 140", and a capacitor 175.

Figure 4:
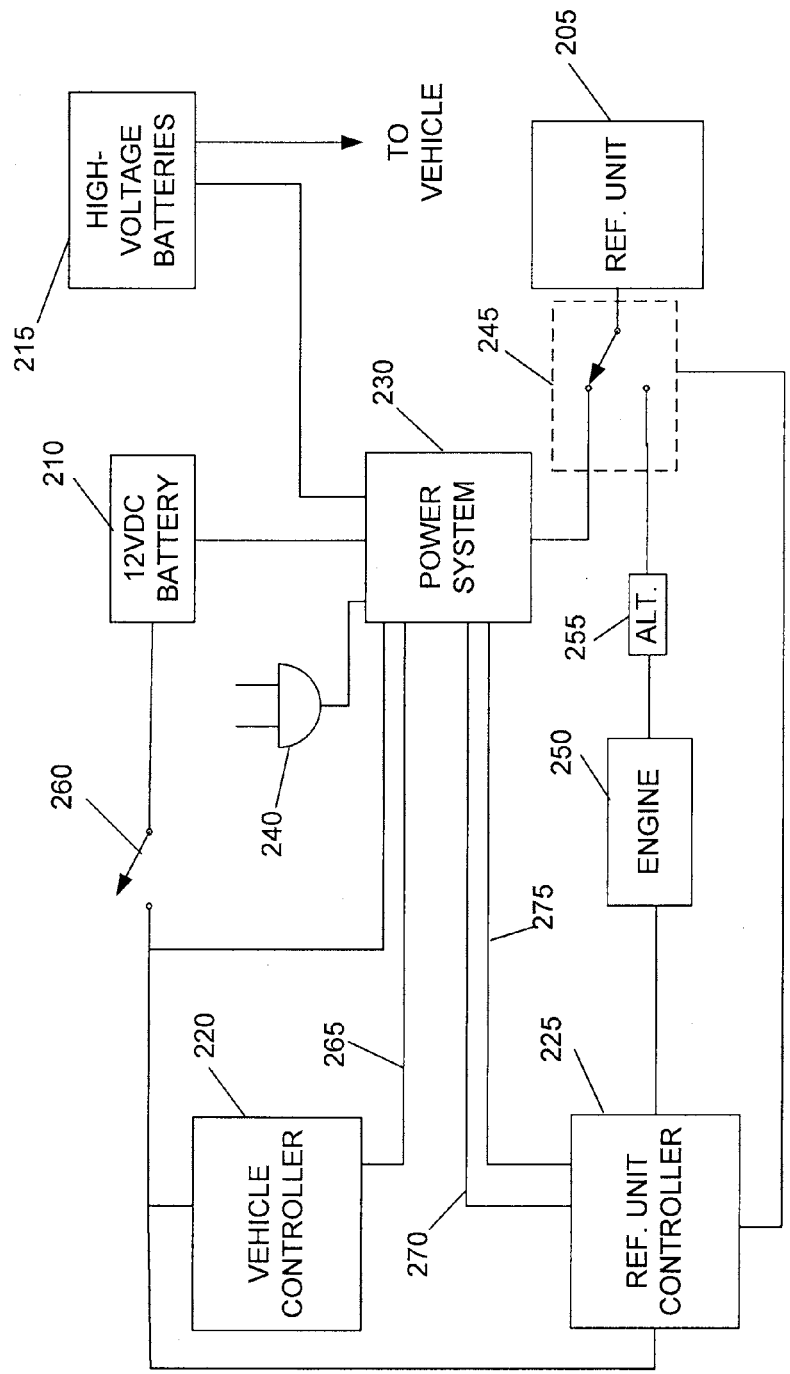
FIG. 4 is a block diagram of a construction of a system for powering a refrigeration unit of a hybrid vehicle.

FIG. 4 shows a block diagram of a construction of a hybrid vehicle system 200 including a refrigeration unit 205. The system 200 includes, among other things, a 12 VDC battery 210, a set of high-voltage batteries 215, a vehicle controller 220, a refrigeration unit controller 225, a refrigeration power system 230 including a connection to shore power 240, a refrigeration unit power switch 245, and a generator set including an internal combustion engine 250 driving an alternator 255. In some constructions, an internal combustion engine 250 drives a compressor and fans of the refrigeration unit 205 directly by one or more belts. In some constructions, an electric motor is powered by the shore power 240 and drives a compressor and fans of the refrigeration unit 205 directly by one or more belts.

A master switch 260 enables the entire system 200. The power system 230 receives power from the shore power connection 240 and the high-voltage batteries 215, and provides power, if available, from either the shore power connection 240 or the high-voltage batteries 215 to the refrigeration unit power switch 245.

The vehicle controller 220 provides an indication to the power system 230, via line 265, that power is available from the high-voltage batteries 215. The power system 230 provides to the refrigeration unit controller 225, via line 270, an indication that power is available from either the shore power connection 240 or the high-voltage batteries 215, and is being provided to the refrigeration unit power switch 245. The refrigeration unit controller 225 provides to the power unit 230, via line 275, an indication that the refrigeration unit 205 is on or off. The refrigeration unit controller 225 controls the refrigeration unit power switch 245, switching between power provided by the power system 230 or, if power is not available from the power system 230, power provided by the belt driven alternator 255. If the refrigeration unit 205 is on, power is provided to the refrigeration unit 205 by the power system 230 if power is available from either the shore power connection 240 or the high-voltage batteries 215. If power is not available from the power system 230 and the refrigeration unit 205 is on, the refrigeration unit controller 225 turns on the internal combustion engine 250 which drives, via a belt, the alternator 255. The alternator 255 then provides power to the refrigeration unit power switch 245, which is set, by the refrigeration unit controller 225, to provide the power from the alternator 255 to the refrigeration unit 205. In alternative constructions, there may be no alternator present in the system 200, instead the internal combustion engine 250 drives a compressor and fans of the refrigeration unit 205 directly.

Figure 5:
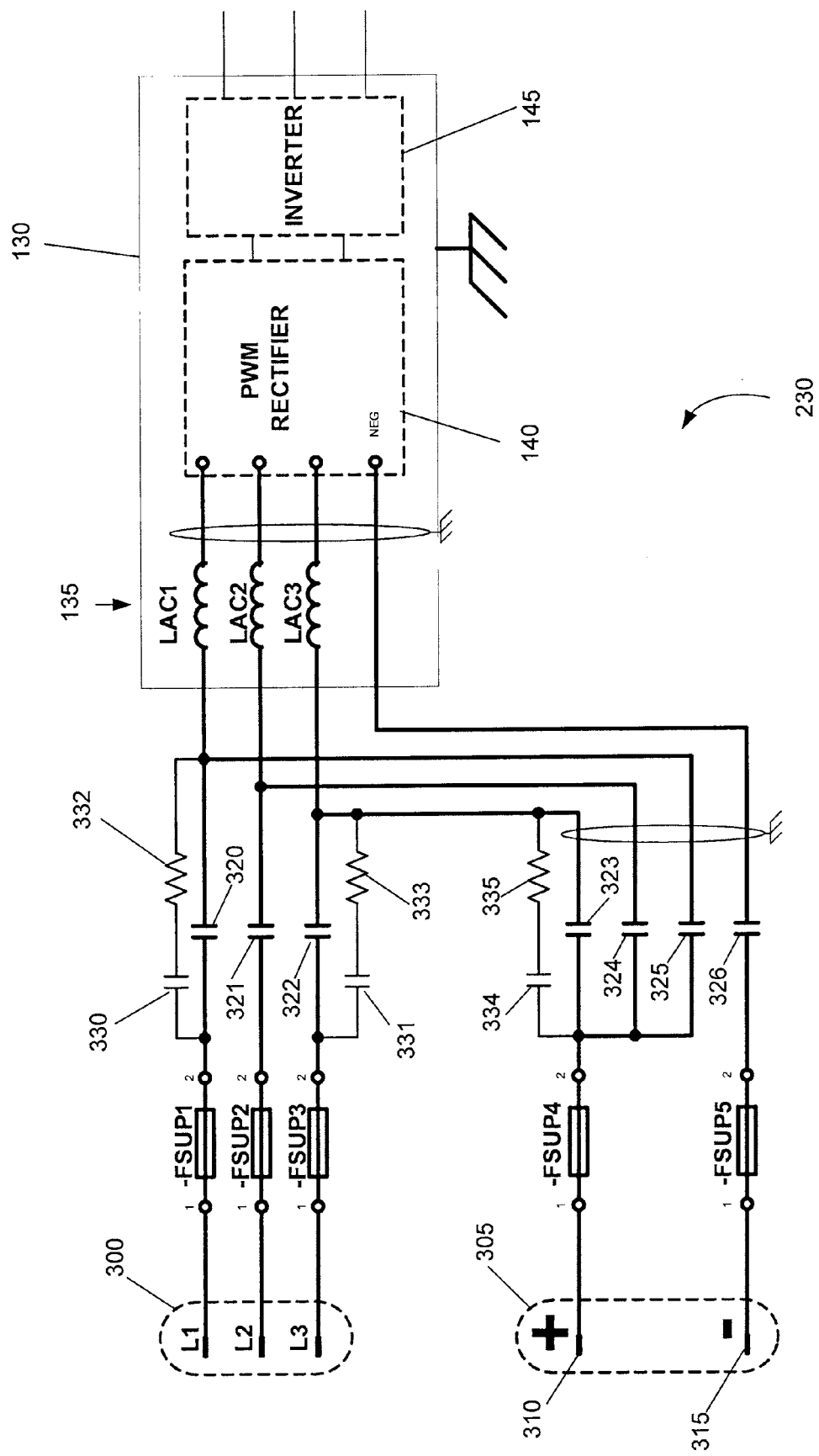
FIG. 5 is a schematic diagram of a construction of a circuit of a power system for using AC or DC power to generate three-phase AC power.

FIG. 5 shows a construction of a portion of the power system 230. The system 230 includes an AC power connector 300 and a DC power connector 305. The AC connector 300 includes three connections L1, L2, and L3 for connecting three-phase shore power (if available) to the system 230. The DC connector 305 includes a positive 310 and a negative 315 connection for connecting to the high-voltage batteries 115. Each input line L1, L2, L3, 310, and 315 is connected to the rest of the system 230 through a fuse FSUP1-FSUP5 sized appropriately for the voltage and current received on its respective input line L1, L2, L3, 310, and 315. Each input line L1, L2, L3, 310, and 315 is also connected to the power converter 130 through a normally-open relay 320-326. As discussed below, when shore power is available, the normally-open relays 320-322 are closed to provide the AC shore power to the power converter 130, and when shore power is not available and DC power from the high-voltage batteries 115 is available, the normally-open relays 323-326 are closed to provide the DC power to the power converter 130. When the AC normally-open relays 320-322 are closed, the DC normally-open relays 323-326 are open, and when the DC normally-open relays 323-326 are closed, the AC normally-open relays 320-322 are open. In some constructions, an interlock module monitors relays 320-322 and 323-326 to ensure that only one of the relay groups 320-322 or 323-326 is closed at any time.

The system 230 also includes AC pre-charging circuits having normally-open relays 330 and 331 and resistors 332 and 333, and a DC pre-charging circuit including a normally-open relay 334 and resistor 335. The pre-charging circuits are used when power is initially applied to the power system 230, and during a transition from AC power to DC power or from DC power to AC power. During a transition, the pre-charging circuits maintain power to the power converter 130, and allow the AC or DC power to be completely removed before the DC or AC power, being transitioned to, is connected.

As discussed above with respect to FIGS. 1-3, if available, AC or DC power is provided to the accumulation choke 135 and the PWM rectifier 140 of the power converter 130. The accumulation choke 135 and the PWM rectifier 140 convert the AC or DC power to DC power having a maximum voltage of about 750 volts. The DC power is the provided to the inverter 145 which converts the DC power to three-phase AC power having a variable voltage of 0 to 525 volts and frequency of about 0 to 100 Hz. In the construction shown in FIG. 4, this AC power is then provided to the refrigeration unit 205 via the refrigeration unit power switch 245. In some constructions, the DC power from the PWM rectifier 140 is also used to supply a DC chopper for an electric heater. The DC chopper provides DC power having a variable voltage of about 0 to 750 V DC.

Figure 6:
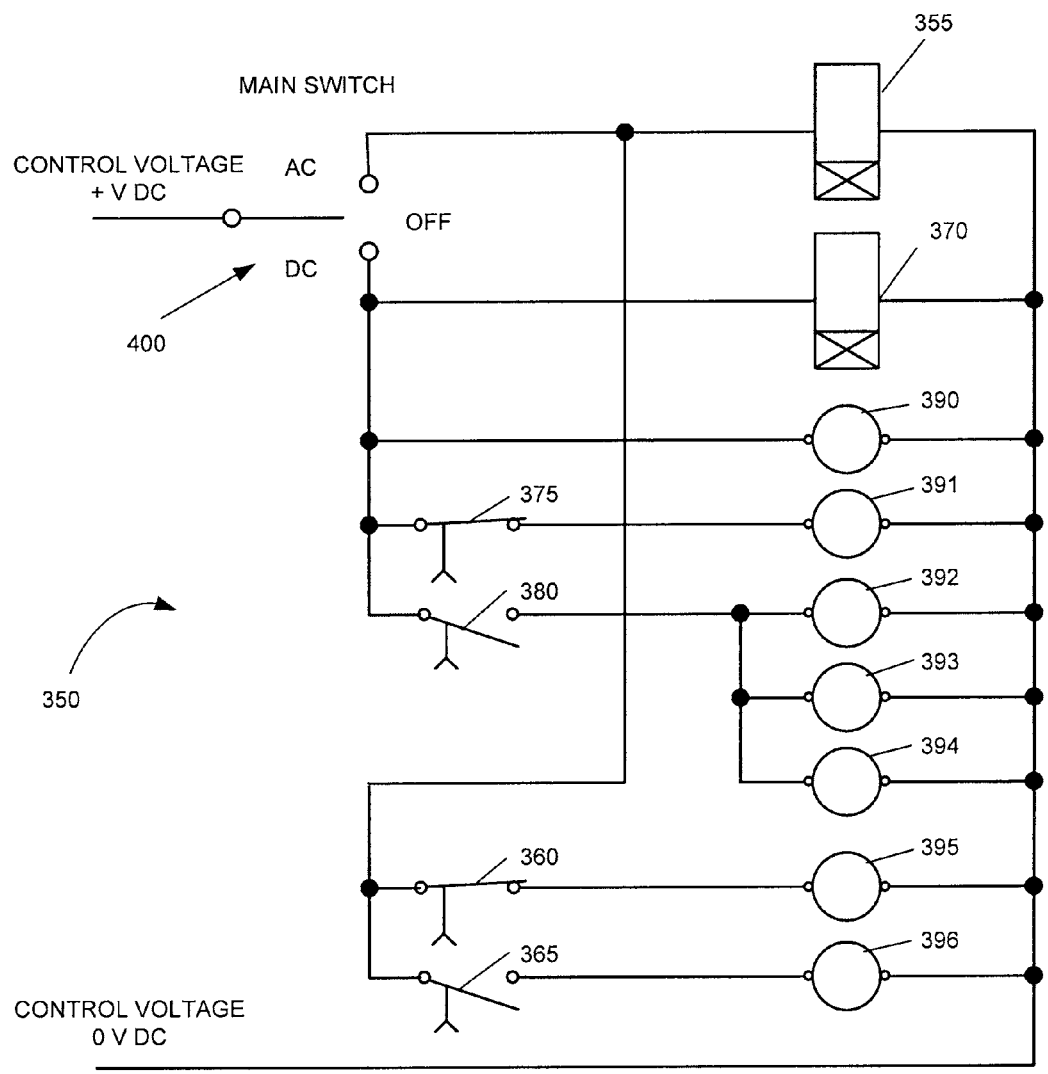
FIG. 6 is a schematic diagram of a construction of a circuit for controlling the operation of the circuit of FIG. 5.

FIG. 6 shows a circuit 350 for controlling the application of AC or DC power to the power converter 130 for the system 230 shown in FIG. 5. The circuit 350 includes an AC delay 355 having a normally-closed switch 360 and a normally-open switch 365, a DC delay 370 having a normally-closed switch 375 and a normally-open switch 380, and a plurality of coils 390-396 for closing corresponding normally-open relays 320-326 shown in FIG. 5. A switch 400 selects either AC or DC power. In the construction shown, the switch 400 is a manual switch requiring an operator to select the AC or DC power. In some embodiments, the switch 400 is an automatic switch where AC power is automatically chosen if available, and if AC power is not available but DC power is available, DC power is automatically chosen. In other embodiments, DC power is automatically chosen if available and AC power is chosen if available when DC power is not available. In some embodiments, if the switch 400 is off, and neither AC nor DC power is available, an internal combustion engine drives the refrigeration unit directly when the refrigeration unit is on.

When the switch 400 is put into the AC position, power is provided to the AC delay 355 and to the AC pre-charge coil 395. The power provided to the AC pre-charge coil 395 closes the AC pre-charge normally-open relays 330-331 (FIG. 5) applying AC power through resistors 332 and 333 to the power converter 130. After a delay period (e.g., five seconds), the AC delay 355 opens the AC normally-closed switch 360 and closes the AC normally-open switch 365. When the AC normally-closed switch 360 opens, power is removed from the AC pre-charge coil 395 and the AC pre-charge normally-open relays 330-331 open. When the AC normally-open switch 365 closes, power is applied to the AC coil 396 and the AC normally-open relays 320-322 close providing three-phase AC power to the power converter 130.

When the switch 400 is put into the DC position, power is provided to the DC delay 370 and to the DC pre-charge coil 391, and to DC negative coil 390. The power provided to the DC pre-charge coil 391 closes the DC pre-charge normally-open relay 334 (FIG. 5) applying DC power through resistor 335 to the power converter 130. The power provided to the DC negative coil 390 closes the normally-open relay 326 connecting the negative connection 315 from the high-voltage batteries 215 to the power converter 130. After a delay period (e.g., five seconds), the DC delay 370 opens the DC normally-closed switch 375 and closes the DC normally-open switch 380. When the DC normally-closed switch 375 opens, power is removed from the DC pre-charge coil 391 and the DC pre-charge normally-open relay 324 opens. When the DC normally-open switch 380 closes, power is applied to the DC coils 392-394 and the DC normally-open relays 323-325 close providing DC power to the power converter 130.

Figure 7:
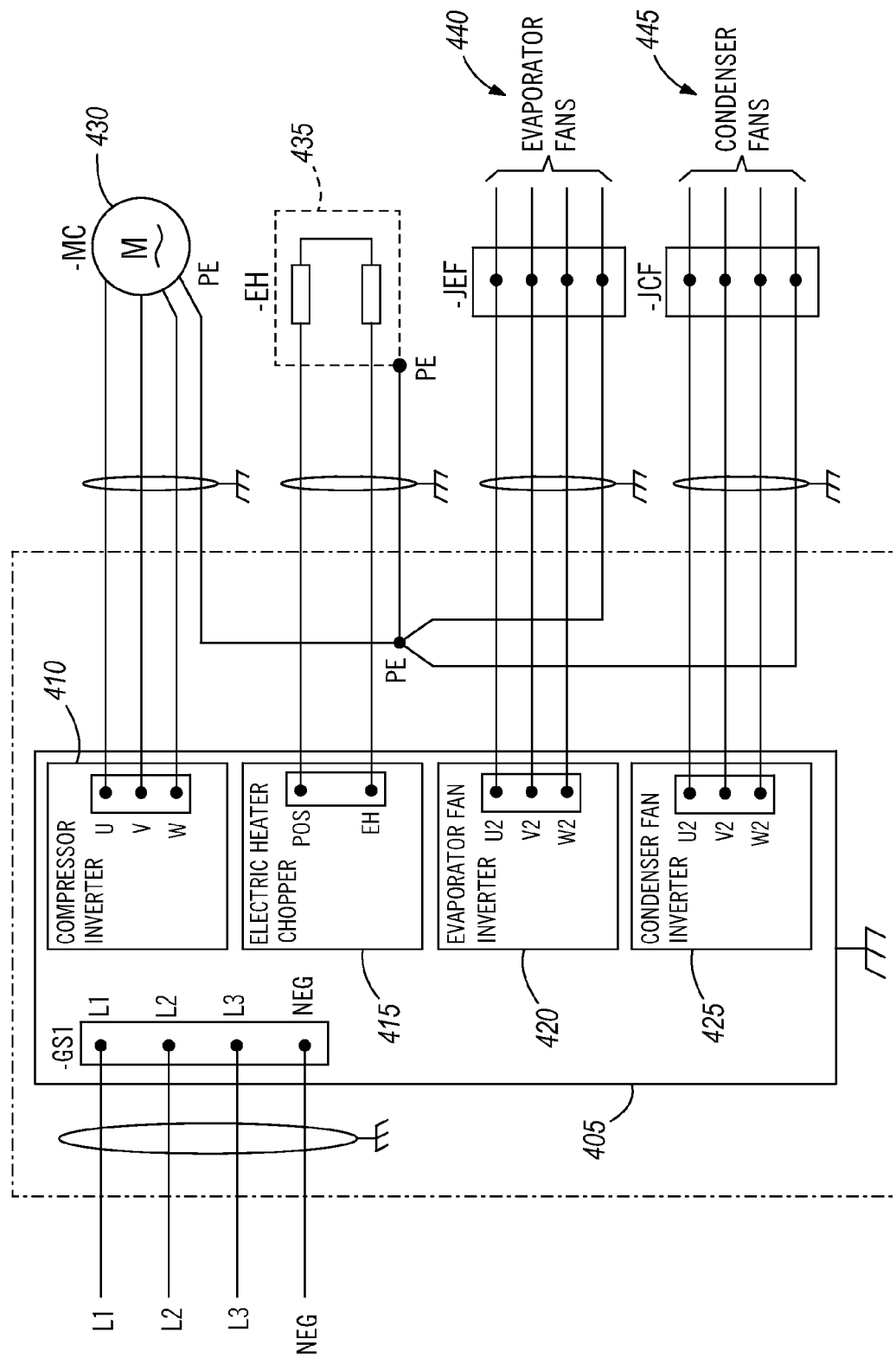
FIG. 7 is an alternative construction of a power system for powering multiple systems.

FIG. 7 shows an alternative construction of a power converter 405 where multiple power converters 410-425 are employed for powering various devices such as a compressor motor 430, an electric heater 435, an evaporator fan 440, and a condenser fan 445.

Figure 8A:
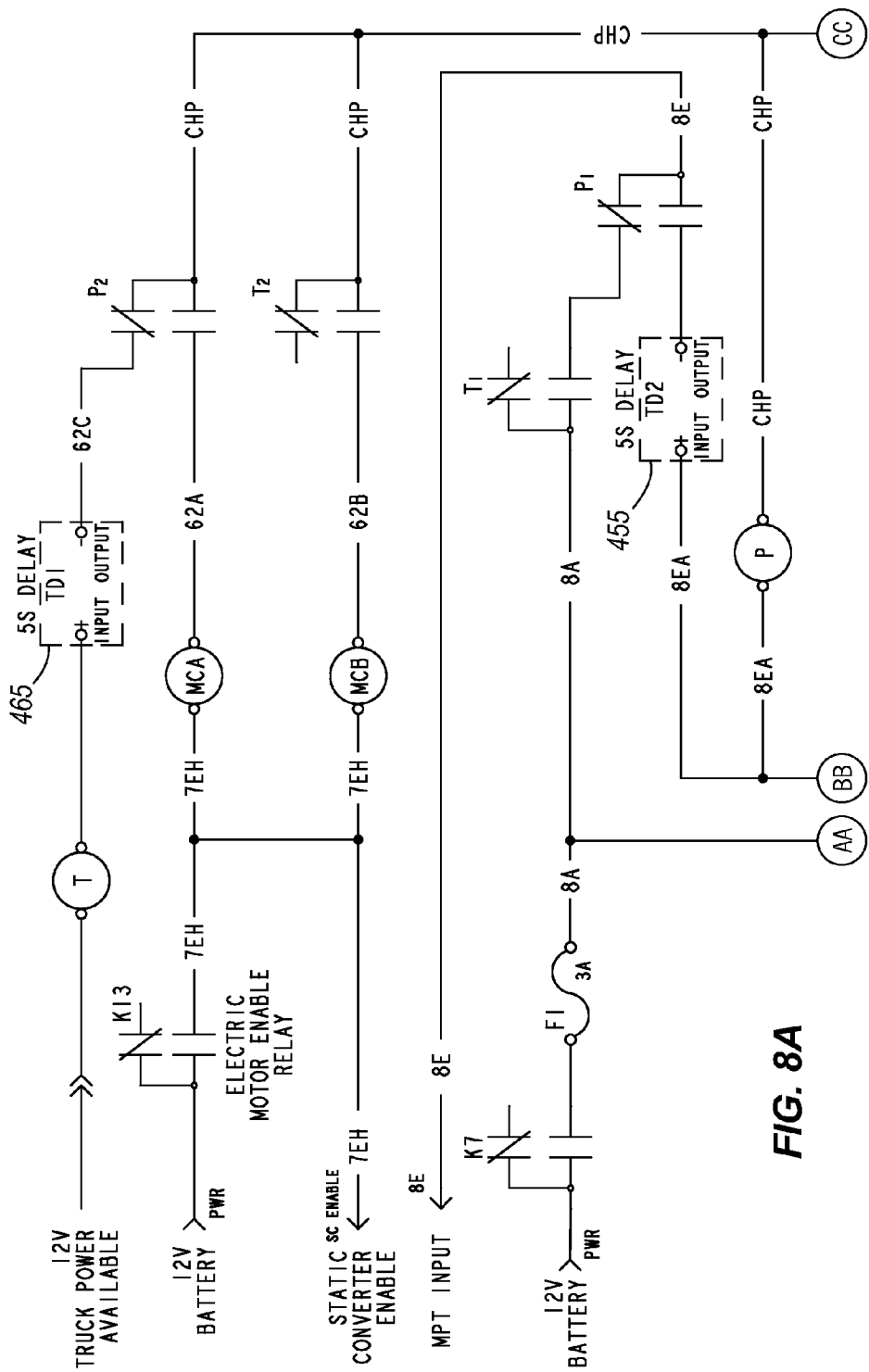
FIGS. 8A and 8B are a schematic diagram of another construction of a power system.
Figure 8B:
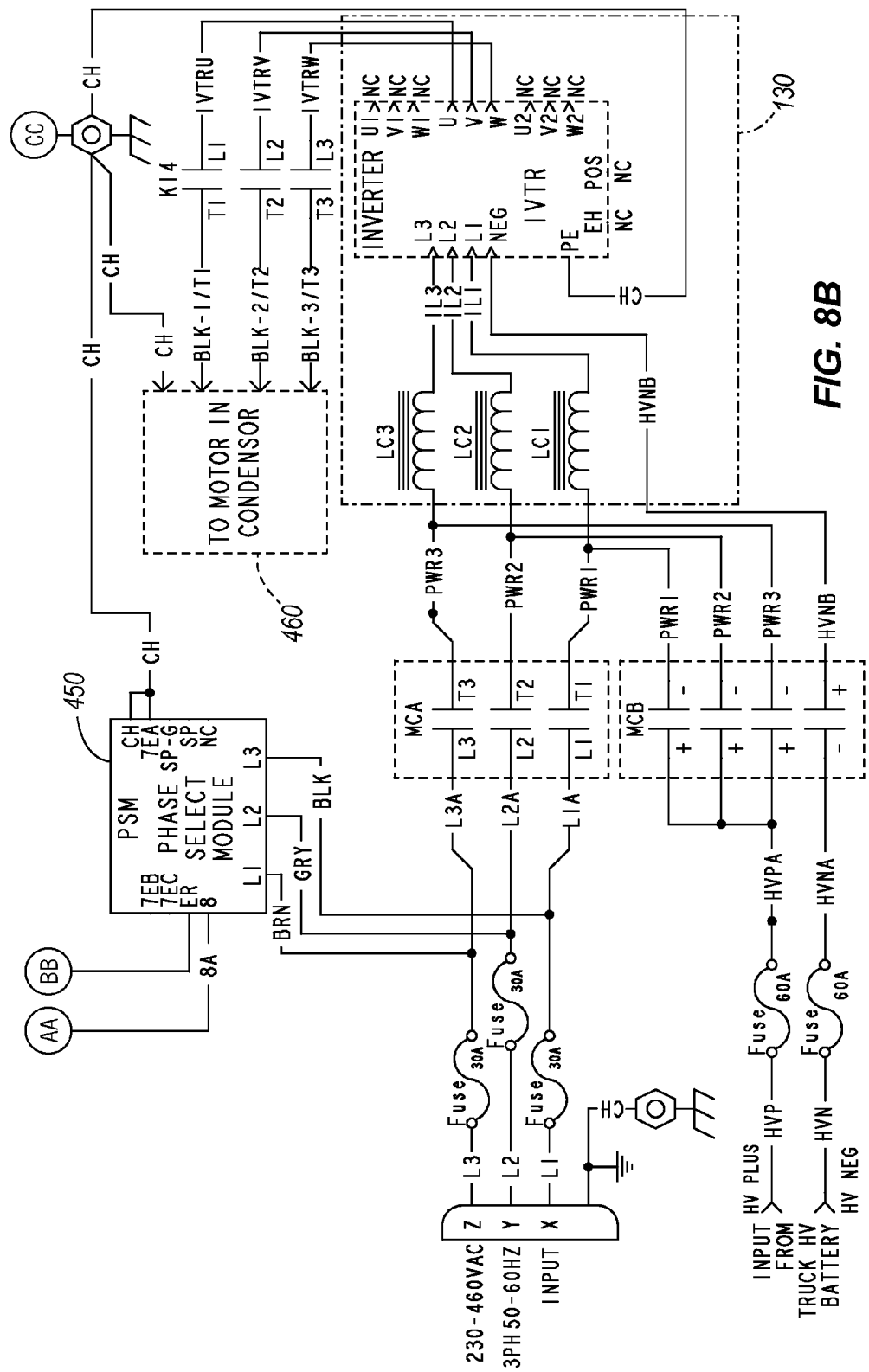
Figure 9A:
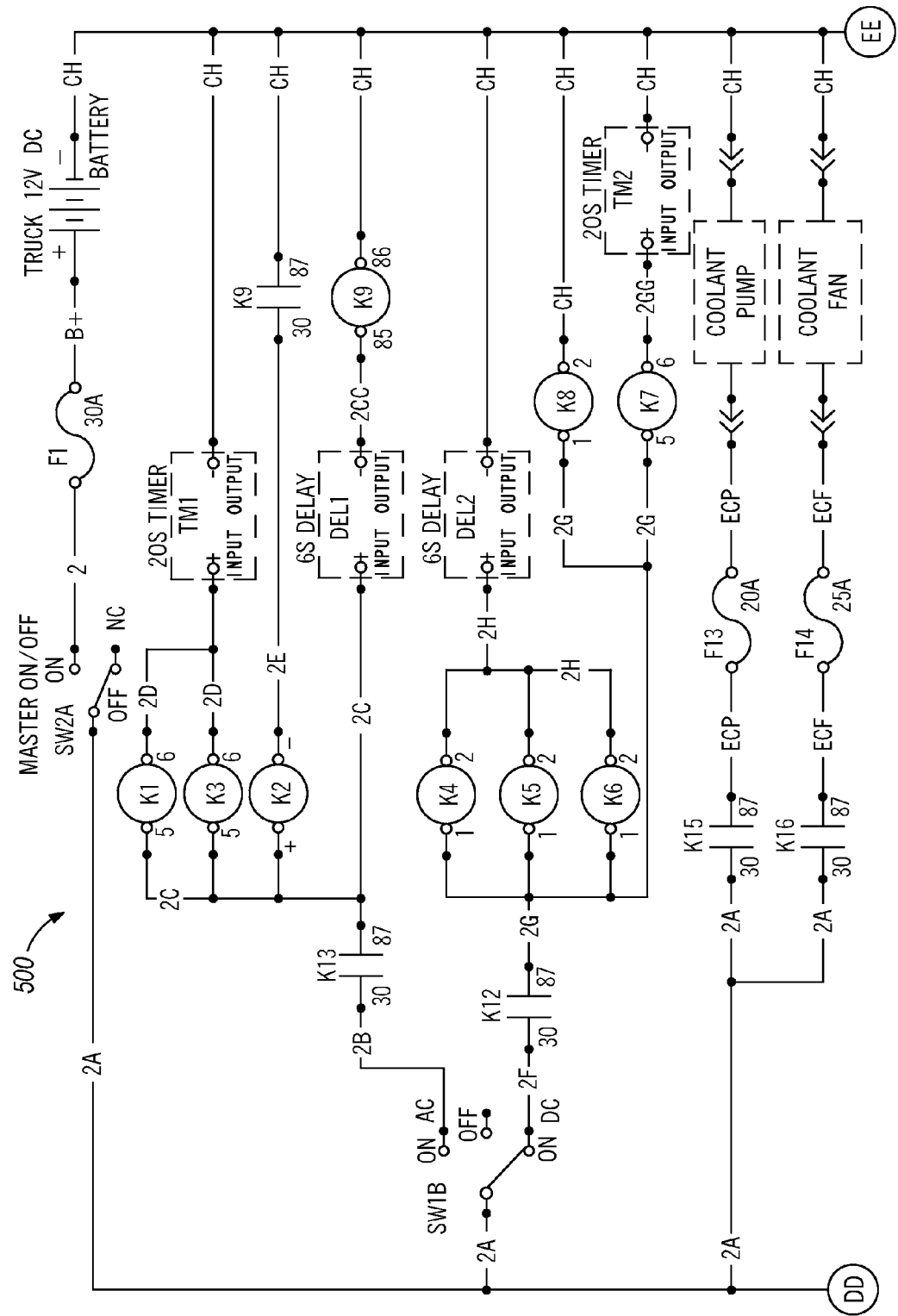
FIGS. 9A, 9B, 9C, and 9D are a schematic diagram of another construction of a power system.
Figure 9B:
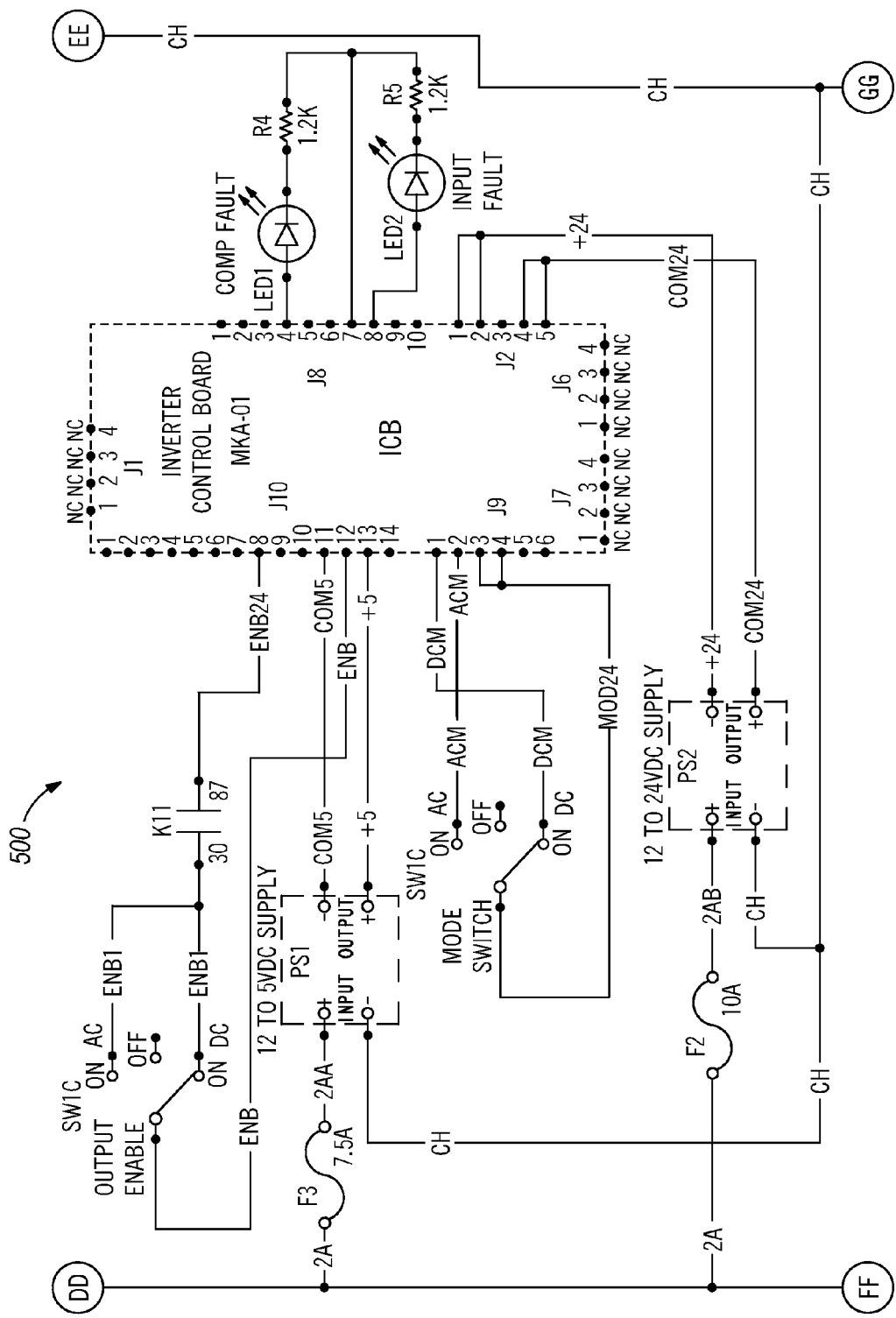
Figure 9C:
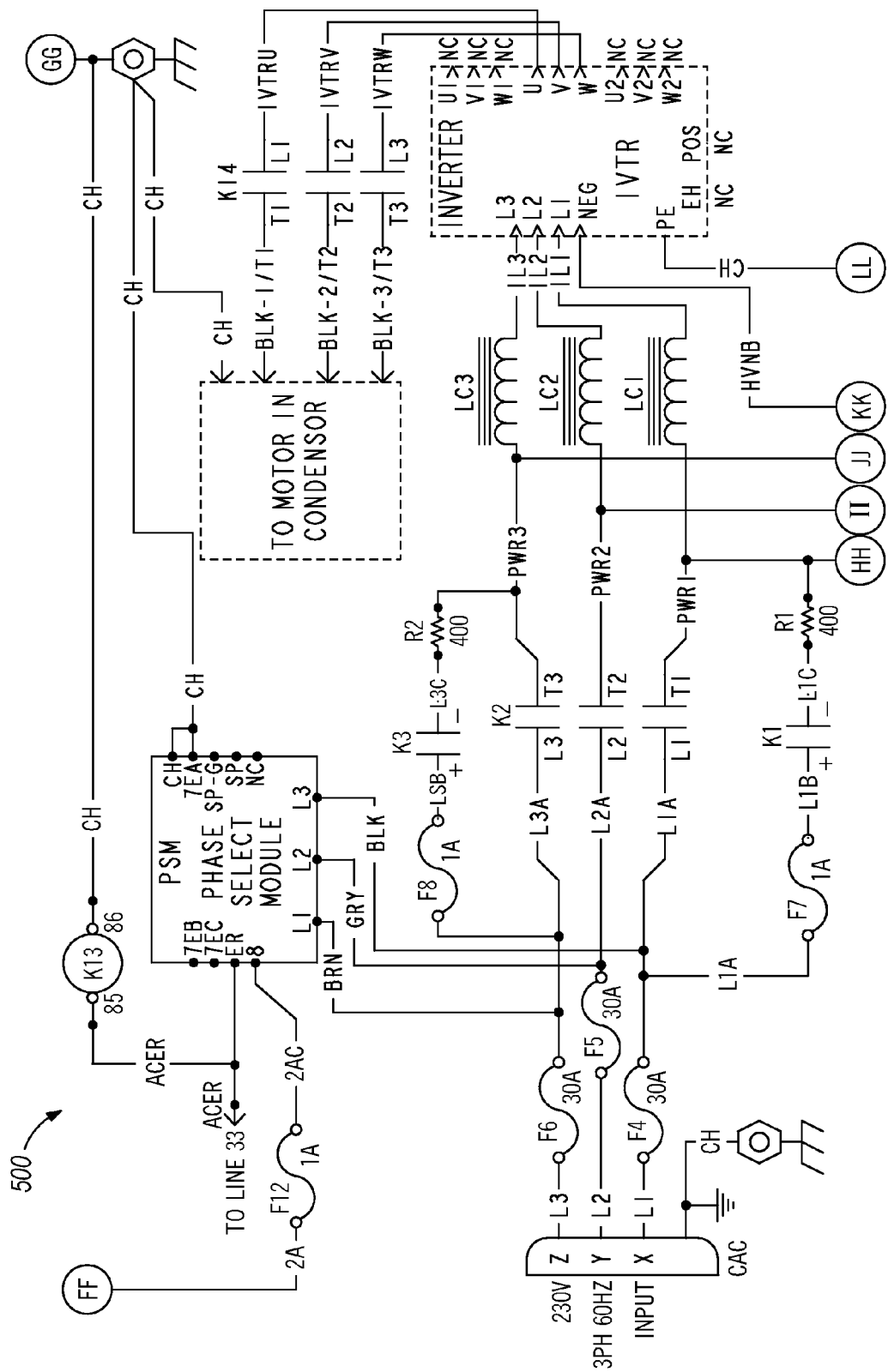
Figure 9D:
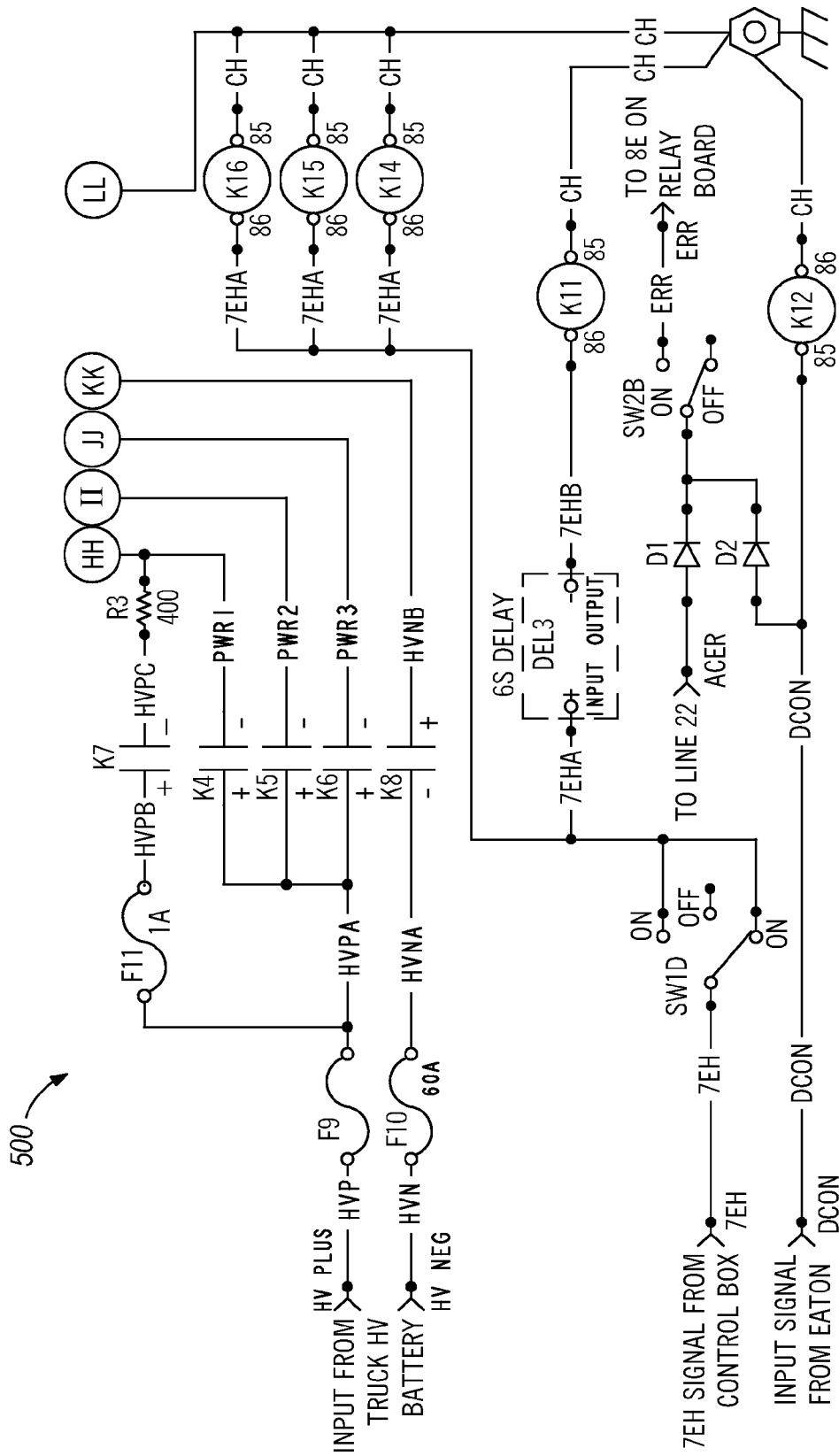

FIGS. 8A and 8B show a schematic diagram of a construction of the power system 230 (FIG. 4). When system power is turned on (switch 260 in FIG. 4 is closed), normally-open relay K7 closes. If shore power is available, i.e., three-phase AC power is provided to L1, L2, L3, and a phase select module 450 receives power from normally-open relay K7 and the AC power lines L1, L2, L3. The phase select module 450 then provides power to line 8EA. The power on line 8EA initiates a five second delay timer 455 and simultaneously powers coil P. The power to coil P closes normally-open relays P1 and P2, and opens normally-closed relay P2. After five seconds, the five second delay timer 455 provides power to output MPT which is provided to the refrigeration unit controller 225 to indicate that power is available from the power system 230 (FIG. 4). If the refrigeration unit controller 225 indicates that the refrigeration unit 205 is on, normally-open relay K13 is closed providing power to coil MCA. The power to coil MCA causes normally-open relays MCA to close, supplying the AC shore power to the power converter 130, which in turn supplies power to a condenser motor 460 (providing normally-open relays K14 are closed).

If AC shore power is not available, normally-closed relay P2 is closed. If the vehicle controller 220 (FIG. 4) indicates that vehicle power is available, the vehicle controller 220 provides power to a five second delay timer 465. After a five second delay, the timer 465 allows power to be applied to a coil T closing normally-open relay T1 and providing power to output MPT, which is provided to the refrigeration unit controller 225 to indicate that power is available from the power system 230 (FIG. 4). If the refrigeration unit controller 225 indicates that the refrigeration unit 205 is on, normally-open relay K13 is closed, providing power to coil MCB. The power to coil MCB causes normally-open relays MCB to close, supplying the DC power from the high-voltage batteries 215 to the power converter 130, which in turn supplies power to the condenser motor 460 (providing normally-open relays K14 are closed).

If neither AC shore power nor DC power from the high-voltage batteries 215 is available, the output MPT to the refrigeration unit controller 225 is low and the refrigeration unit controller 225 starts the engine 250 which drives the refrigeration unit 205 directly.

FIGS. 9A, 9B, 9C, and 9D show a schematic diagram of an alternative construction of a power system 500.

Figure 10:
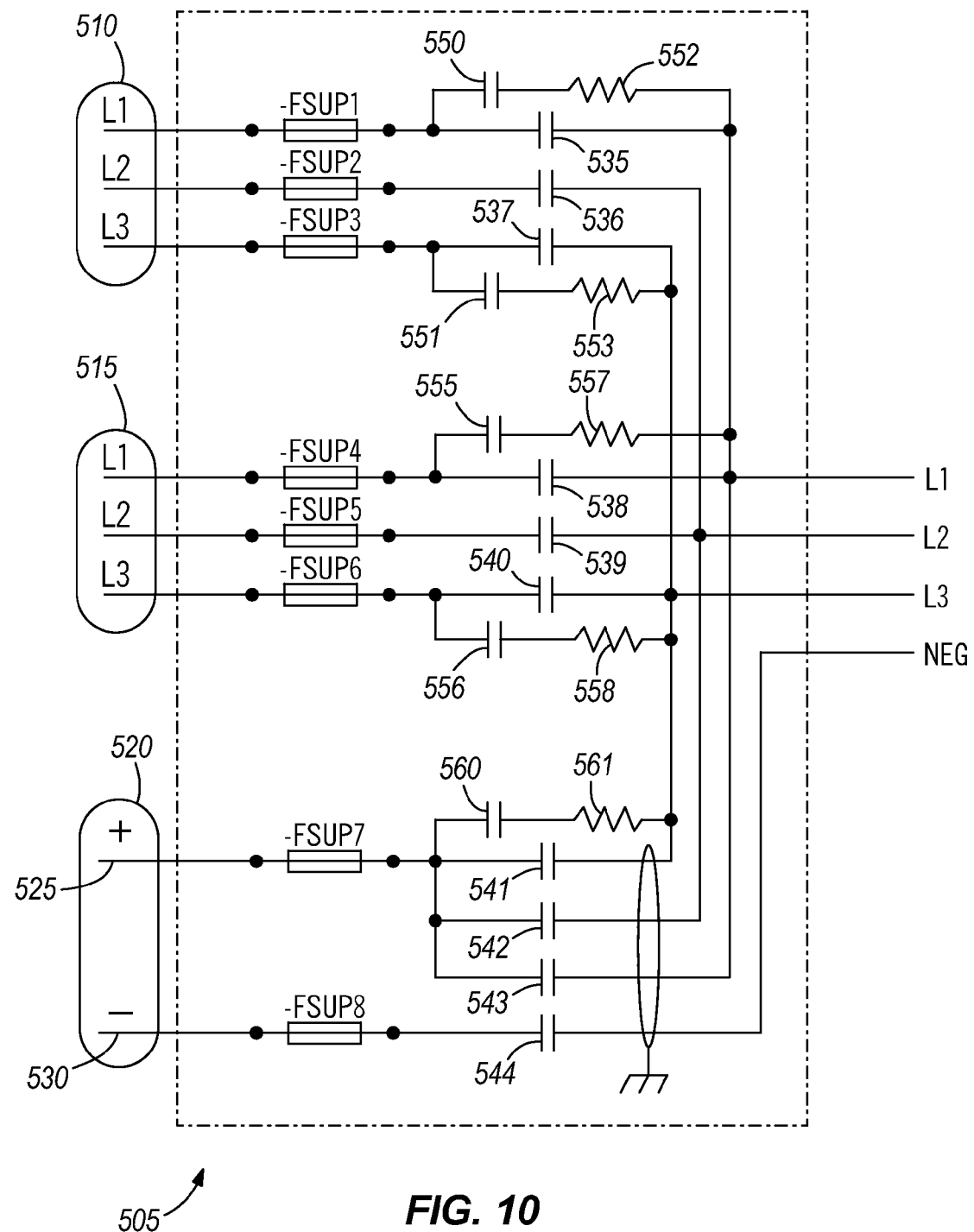
FIG. 10 is a block diagram of another construction of a system for powering a refrigeration unit of a hybrid vehicle.

FIG. 10 shows an alternate construction of a power system 505. The system 505 includes a first AC power connector 510, a second AC power connector 515, and a DC power connector 520. The first AC connector 510 includes three connections L1, L2, and L3 for connecting three-phase power from the belt driven alternator 255 to the system 505. The second AC connector 515 includes three connections L1', L2', and L3' for connecting three-phase shore power (if available) to the system 505. The DC connector 520 includes a positive connection 525 and a negative 530 connection for connecting to the high-voltage batteries 215 to the system 505. Each input line L1, L2, L3, L1', L2', L3', 525, and 530 is connected to the rest of the system 505 through a fuse FSUP1-FSUP8 sized appropriately for the voltage and current received on its respective input line L1, L2, L3, L1', L2', L3', 525, and 530. Each input line L1, L2, L3, L1', L2', L3', 525, and 530 is also connected to the power converter 130 through a normally-open relay 535-544. As discussed below, when shore power is available, the normally-open relays 538-540 are closed to provide the AC shore power to the power converter 130, and when shore power is not available and DC power from the high-voltage batteries 215 is available, the normally-open relays 541-544 are closed to provide the DC power to the power converter 130. When neither shore power nor DC power is available, the normally-open relays 535-537 are closed to provide AC power from the alternator 255 to the power converter 130. Only one set of normally-open relays 535-537, 538-540, or 541-544 are closed at any time.

The system 505 also includes first AC pre-charging circuits having normally-open relays 550 and 551 and resistors 552 and 553, second AC pre-charging circuits having normally-open relays 555 and 556 and resistors 557 and 558, and a DC pre-charging circuit having a normally-open relay 560 and a resistor 561. The pre-charging circuits are used when power is initially applied to the power system 505, and during a transition between one input power to another to maintain power to the power converter 130 during the transition, and allowing the power being transitioned from to be completely removed before the power being transitioned to is connected.

As discussed above with respect to FIGS. 1-3, if available, AC or DC power is provided to the accumulation choke 135 and the PWM rectifier 140 of the power converter 130 convert the AC or DC power to DC power having a maximum voltage of about 750 volts. The DC power is the provided to the inverter 145, which converts the DC power to three-phase AC power having a voltage of 0 to 525 volts. In the construction shown in FIG. 4, this AC power is then provided to the refrigeration unit 205 via the refrigeration unit power switch 245.

Figure 11:
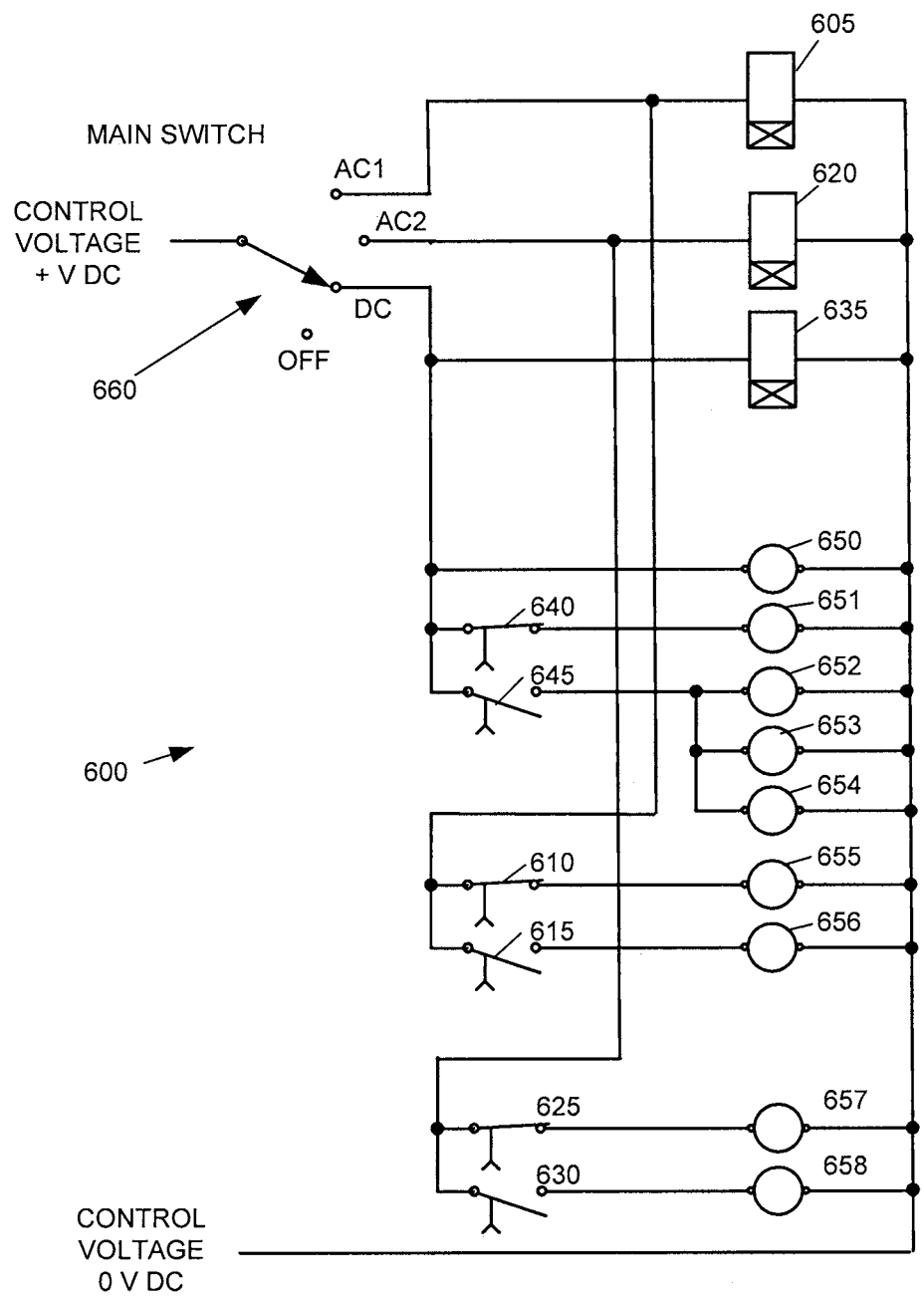
FIG. 11 is a schematic diagram of another construction of a circuit of a power system for using AC or DC power to generate three-phase AC power.

FIG. 11 shows a circuit 600 for controlling the application of the first AC power, the second AC power, or the DC power to the power converter 130 for the system 505 shown in FIG. 10. The circuit 600 includes a first AC delay 605 having a normally-closed switch 610 and a normally-open switch 615, a second AC delay 620 having a normally-closed switch 625 and a normally-open switch 630, a DC delay 635 having a normally-closed switch 640 and a normally-open switch 645, and a plurality of coils 650-658 for closing corresponding normally-open relays 534-544, 550-551, 555, 556, and 560 shown in FIG. 10. A switch 660 selects either the first AC power, the second AC power, or the DC power. In the construction shown, the switch 660 is a manual switch requiring an operator to select the power. In some constructions, the switch 660 is an automatic switch where the second AC power (shore power) is automatically chosen if available, and if the first AC power is not available but DC power is available, the DC power is automatically chosen. If neither the second AC power nor the DC power is available, the switch automatically chooses the first AC power. The circuit 600 operates similar to the operation of circuit 350 of FIG. 6 with the addition of a second AC power.

In some constructions, a liquid cooling system of the hybrid vehicle is used to cool one or more components of the power system 230 (e.g., the power converter 130) and/or one or more components of the alternator 255 (e.g., the belt driven alternator 110). In other constructions, a liquid cooling system of the refrigeration unit 205 is used to cool one or more components of the power system 230 and/or one or more components of the alternator 255.

In some constructions, shore power is provided to a charging circuit, in addition to the power system 230, for charging the high-voltage batteries 215. In some constructions, the refrigeration unit 205 is operated exclusively using either DC power from the high-voltage batteries 215 or AC shore power 240.

Figure 12:
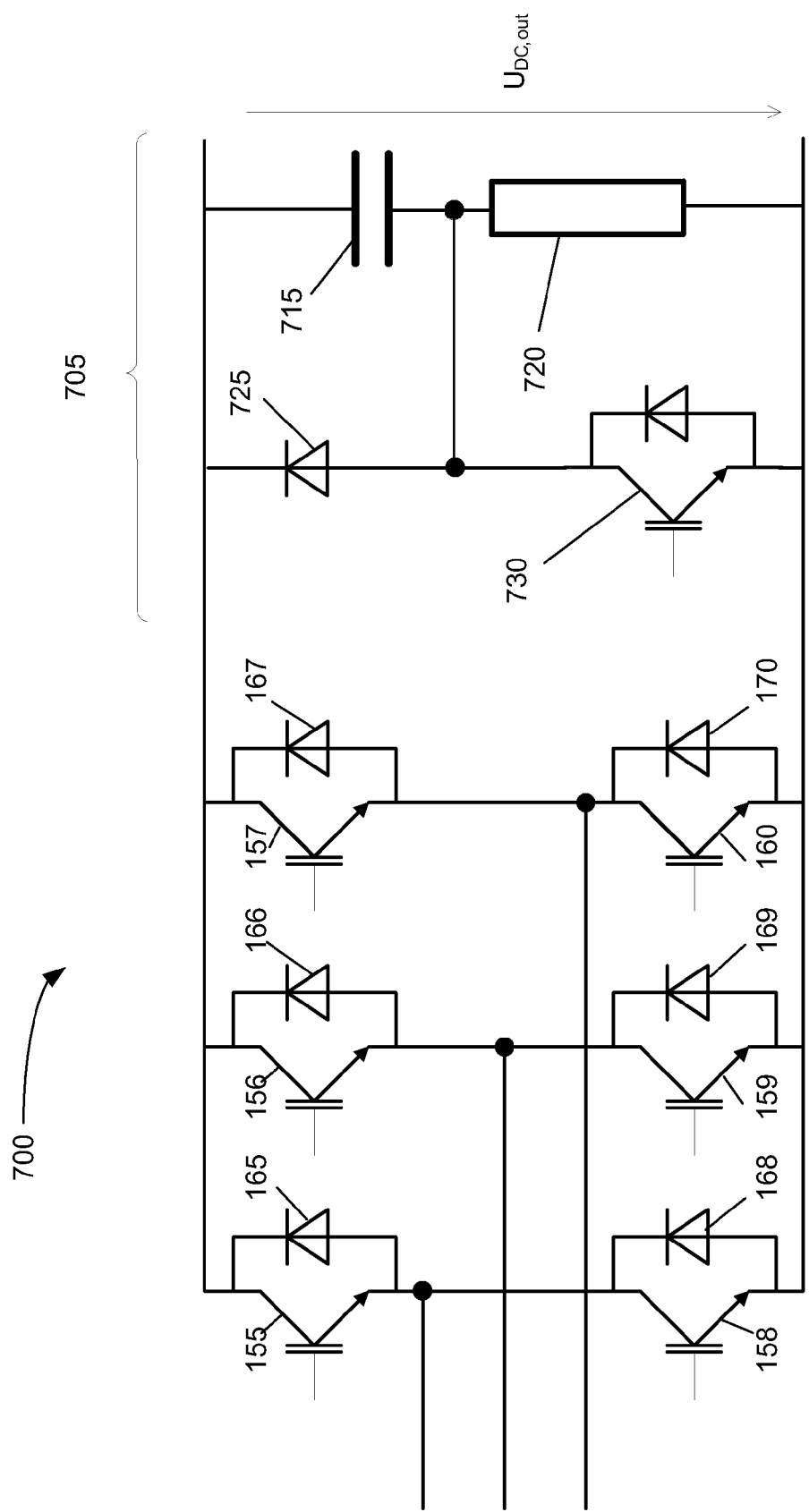
FIG. 12 is a schematic diagram of a construction of a full-control PWM rectifier, incorporating a pre-charge circuit, for use with three-phase AC power.

FIG. 12 shows a schematic diagram of an alternative construction of a full-controlled PWM rectifier 700 incorporating a pre-charging circuit 705. The full-controlled PWM rectifier 700 includes six insulated gate bipolar transistors (IGBT) 155-160, each IGBT 155-160 having a diode 165-170 connected across its collector and emitter, and operates the same as system 100 described above. The pre-charging circuit 705 includes a capacitor 715, a resistor 720, a diode 725, and an IGBT 730. The pre-charging circuit 705 operates to buffer a current surge encountered when switching from one power source to a second power source, and eliminates the need for the pre-charging and delay circuits described for the controllers above. The pre-charging circuit 705 operates by opening the IGBT 730 prior to transitioning the power source. Applying the second power source and removing the first power source while the IGBT 730 is open. The IGBT 730 is held open until the capacitor 715 is fully charged forcing current to travel through the resistor 720. Once the capacitor 715 is fully charged, the IGBT 730 is closed.

Constructions of the invention are capable of being used in non-hybrid vehicles, receiving AC power from an alternator of the vehicle during operation of the vehicle and having a shore power connection for use when the vehicle is not operating.

Thus, the invention provides, among other things, systems and method for powering a refrigeration unit of a hybrid vehicle.

What is claimed is:

1. A power system for powering a refrigeration unit, the power system comprising:
   a first connection configured to receive power from a first power source, the first power source being a first high-voltage alternating current (AC) power source;
   a second connection configured to receive power from a second power source, the second power source being a high-voltage direct current (DC) power source;
   a third connection configured to receive power from a third power source, the third power source being a second high-voltage AC power source;
   a power converter configured to supply power to the refrigeration unit, wherein the power converter includes an accumulation choke and a PWM rectifier configured to receive the first high-voltage AC power, the second high-voltage AC power, and the high-voltage DC power and convert the received power to a second DC power; and
   a switch connecting one of the first connection, the second connection and the third connection to the power converter;
   wherein the power system couples the first power source to the power converter based on a position of the switch when power is received at the first connection, couples the second power source to the power converter based on a position of the switch when power is received at the second connection but not the first connection, and couples the third power source to the power converter based on a position of the switch, and wherein the PWM rectifier includes:
- a plurality of diodes configured as a bridge rectifier,
- a plurality of electronic switches, one of the plurality of electronic switches coupled across each of the plurality of diodes, and
- a pre-charging circuit maintaining power to the power converter when switching between the first power source, the second power source, and the third power source.

2. The system of claim 1, wherein the second DC power is between about 0 and 750 volts.

3. The system of claim 1, wherein the first high-voltage AC power source includes a shore power.

4. The system of claim 1, wherein the high-voltage DC power source includes a plurality of high-voltage batteries used to power a hybrid vehicle.

5. The system of claim 1, wherein the second high-voltage AC power source includes a belt-driven alternator.

6. The system of claim 1, wherein the first high-voltage AC power source includes a shore power, the high-voltage DC power source includes a plurality of high-voltage batteries used to power a hybrid vehicle, and the second high-voltage AC power source includes a belt-driven alternator.

7. A system for powering a refrigeration unit coupled with a vehicle having a plurality of high-voltage batteries, the system comprising:
- a power system coupled to the plurality of high-voltage batteries, the power system configured to receive power from a shore power source, and the power system configured to receive power from an alternator, wherein the power system includes a power converter having an accumulation choke and a PWM rectifier, the power converter configured to receive one of a high-voltage DC power from the plurality of high-voltage batteries, a high-voltage AC power from the shore power source, and a high-voltage AC power from the alternator and to convert the received power into a second high-voltage DC power, the power system also including a switch connecting one of the shore power source, the alternator and the plurality of high-voltage batteries to the power converter based on a position of the switch;
- a refrigeration control unit coupled to the power system, the refrigeration control unit receiving an indication from the power system of the availability of power from the high-voltage batteries, the shore power source, and the alternator; and wherein the refrigeration control unit links power from the power system to the refrigeration unit when power is available from the power system, wherein the PWM rectifier includes:
- a plurality of diodes configured as a bridge rectifier,
- a plurality of electronic switches, one of the plurality of electronic switches coupled across each of the plurality of diodes, and
- a pre-charging circuit maintaining power to the power converter when switching between the shore power source, the alternator, and the plurality of high-voltage batteries.

8. The system of claim 7, wherein the power system includes a frequency inverter configured to receive the second high-voltage DC power from the PWM rectifier and convert the second high-voltage DC power to an AC voltage and to provide the AC voltage to the refrigeration unit.

9. A method of powering a refrigeration unit, the method comprising:
- receiving at a first input a high-voltage DC power from a plurality of batteries of a hybrid vehicle;
- receiving at a second input a high-voltage AC power from an electric mains;
- receiving at a third input a third high-voltage AC power from an alternator;
- connecting one of the first input, the second input and the third input to a power converter based on a position of a switch, the connecting act coupling one of the high-voltage DC power, the high-voltage AC power, and the third high-voltage AC power to the power converter thereby resulting in a coupled power;
- disconnecting the coupled power from the power converter when the position of the switch has changed;
- converting the high-voltage DC power into a second high-voltage AC power by directing the high-voltage DC power through an accumulator choke and a PWM rectifier when the high-voltage DC power is coupled to the power converter and converting the high-voltage AC power into the second high-voltage AC power by directing the high-voltage AC power through the accumulator choke and the PWM rectifier when the high-voltage AC power is coupled to the power converter;
- providing the second high-voltage AC power to the refrigeration unit; and
  - directing one of the high-voltage DC power and the high-voltage AC power through a pre-charging circuit at an output of the PWM rectifier, the pre-charging circuit maintaining power to the power converter when switching between the first input, the second input, and the third input.

10. The system of claim 7, wherein the pre-charging circuit buffers a current surge when an input power is switched from a first power source to a second power source.

11. The system of claim 1, wherein the PWM rectifier is configured to receive the second high-voltage AC power directly such that the second high-voltage AC power bypasses the accumulation choke.

12. The system of claim 7, wherein the power system is coupled to an alternator, and the PWM rectifier is configured to:
- receive one of the high-voltage DC power from the plurality of high-voltage batteries, the high-voltage AC power from the shore power source, and a third high-voltage AC power from the alternator, and
- to convert the received power into the second high-voltage DC power.

13. The system of claim 12, wherein the PWM rectifier is configured to receive the third high-voltage AC power directly such that the third high-voltage AC power bypasses the accumulation choke.

14. The method of claim 9, further comprising:
- receiving at a third input a third high-voltage AC power from an alternator;
- connecting one of the first input, the second input and the third input to a power converter based on the position of the switch, the connecting act coupling one of the high-voltage DC power, the high-voltage AC power, and the third high-voltage AC power to the power converter thereby resulting in a coupled power;
- converting the third high-voltage AC power into the second high-voltage AC power by directing the third high-voltage AC power through the PWM rectifier when the third high-voltage AC power is coupled to the power converter.

15. The system of claim 1, wherein the switch is an automatic switch, wherein a controller automatically selects a position of the automatic switch to connect one of the first connection, the second connection and the third connection to the power converter.

16. The system of claim 7, wherein the switch is an automatic switch, wherein a controller automatically selects a position of the automatic switch to connect one of the shore power source, the alternator and the high-voltage batteries to the power converter.

17. The method of claim 9, wherein the switch is an automatic switch, wherein a controller automatically selects a position of the automatic switch to connect one of the first input, the second input and the third input to the power converter.

18. The system of claim 1, wherein the switch is a manual switch, wherein a user selects a position of the manual switch to connect one of the first connection, the second connection and the third connection to the power converter.

19. The system of claim 7, wherein the switch is a manual switch, wherein a user selects a position of the manual switch to connect one of the shore power source, the alternator and the high-voltage batteries to the power converter.

20. The method of claim 9, wherein the switch is a manual switch, wherein a user selects a position of the manual switch to connect one of the first input, the second input and the third input to the power converter.

\* \* \* \* \*